(12) United States Patent
Garb

(10) Patent No.: US 8,742,943 B2
(45) Date of Patent: Jun. 3, 2014

(54) GROUND DETECTION CIRCUIT AND METHOD OF MANUFACTURING THE SAME

(75) Inventor: Jeffrey W. Garb, West Hills, CA (US)

(73) Assignee: Belkin International, Inc., Playa Vista, CA (US)

( * ) Notice: Subject to any disclaimer, the term of this patent is extended or adjusted under 35 U.S.C. 154(b) by 477 days.

(21) Appl. No.: 13/021,706

(22) Filed: Feb. 4, 2011

(65) Prior Publication Data

US 2011/0187552 A1    Aug. 4, 2011

Related U.S. Application Data

(60) Provisional application No. 61/301,471, filed on Feb. 4, 2010.

(51) Int. Cl.
*G08B 5/22* (2006.01)
*H02H 9/08* (2006.01)
*H01R 43/00* (2006.01)

(52) U.S. Cl.
USPC ............. 340/815.45; 340/12.32; 340/538; 340/635; 340/687; 323/301; 323/304; 323/307; 323/318

(58) Field of Classification Search
USPC ............. 340/538, 687, 693.1, 287–288, 292, 340/12.32, 635–664; 323/301, 304, 307, 323/318
See application file for complete search history.

(56) References Cited

U.S. PATENT DOCUMENTS

| 4,097,843 A | 6/1978 | Basile |
|---|---|---|
| 4,120,031 A | 10/1978 | Kincheloe et al. |
| 4,331,122 A | 5/1982 | Sohner et al. |
| 4,460,951 A | 7/1984 | Fenter et al. |
| 4,816,746 A | 3/1989 | Peak |
| 4,829,289 A | 5/1989 | Kallman et al. |

(Continued)

FOREIGN PATENT DOCUMENTS

| CN | 1276641 A | 12/2000 |
|---|---|---|
| CN | 1541439 | 10/2004 |

(Continued)

OTHER PUBLICATIONS

International Search Report from PCT/US2011/023829, 11 pages. Apr. 8, 2011.

(Continued)

*Primary Examiner* — George Bugg
*Assistant Examiner* — Sharmin Akhter
(74) *Attorney, Agent, or Firm* — Bryan Cave LLP

(57) ABSTRACT

In some embodiments, a system including an electronic device. The electronic device includes an electric power input configured to receive an electric power signal and has an input line terminal and an input neutral terminal. In some embodiments, the electric power input can also have an input ground terminal. The electronic device includes a metal oxide varistor protection module configured to protect at least one of the system or the electronic device. The electronic device includes a ground detection module configured to indicate the presence of an electric ground. The electronic device includes an electric power output having an output line terminal and an output neutral terminal. In some embodiments, the electric power output can also have an output ground terminal. The electric power input, the metal oxide varistor protection module, the ground detection module, and the electric power output are electrically coupled in series with each other. Other embodiments are disclosed.

25 Claims, 14 Drawing Sheets

(56) References Cited

U.S. PATENT DOCUMENTS

| | | | |
|---|---|---|---|
| 4,901,007 | A | 2/1990 | Sworm |
| 4,912,589 | A | 3/1990 | Stolarczyk |
| 4,928,218 | A | 5/1990 | Kluttz |
| 4,931,725 | A | 6/1990 | Hutt et al. |
| 4,999,728 | A | 3/1991 | Curl |
| 5,071,367 | A * | 12/1991 | Luu .................. 439/501 |
| 5,225,816 | A | 7/1993 | Lebby et al. |
| 5,424,903 | A | 6/1995 | Schreiber |
| 5,589,764 | A | 12/1996 | Lee |
| 5,701,109 | A | 12/1997 | Poulsen |
| 5,774,321 | A | 6/1998 | Kim et al. |
| 5,793,352 | A | 8/1998 | Greenberg et al. |
| 5,869,960 | A | 2/1999 | Brand |
| 5,973,898 | A | 10/1999 | Merchant et al. |
| 6,095,850 | A | 8/2000 | Liu |
| 6,118,639 | A * | 9/2000 | Goldstein ............... 361/55 |
| 6,226,162 | B1 | 5/2001 | Kladar et al. |
| 6,367,024 | B1 | 4/2002 | Ezell |
| 6,555,990 | B1 | 4/2003 | Yang |
| 6,741,442 | B1 | 5/2004 | McNally et al. |
| 7,142,402 | B1 * | 11/2006 | Chaudhry ............... 361/42 |
| 7,332,834 | B2 | 2/2008 | Lee |
| 7,540,767 | B1 | 6/2009 | Czarnecki |
| 7,598,631 | B2 | 10/2009 | Szabados et al. |
| 7,677,921 | B2 | 3/2010 | Czarnecki |
| 7,847,429 | B2 | 12/2010 | Miyama et al. |
| 2003/0086224 | A1 | 5/2003 | Elms et al. |
| 2003/0103366 | A1 | 6/2003 | MacDonald et al. |
| 2003/0169606 | A1 | 9/2003 | Miermans |
| 2005/0076252 | A1 | 4/2005 | Birmingham |
| 2005/0146219 | A1 | 7/2005 | Pincu et al. |
| 2005/0215285 | A1 | 9/2005 | Lin |
| 2007/0127177 | A1 | 6/2007 | Benton et al. |
| 2009/0009936 | A1 | 1/2009 | Neu et al. |
| 2009/0085576 | A1 * | 4/2009 | Lenzie et al. ............. 324/510 |
| 2009/0256534 | A1 | 10/2009 | Videtich et al. |
| 2009/0289501 | A1 | 11/2009 | Garb |
| 2009/0294150 | A1 | 12/2009 | McGinley et al. |
| 2009/0295226 | A1 | 12/2009 | Hodges et al. |
| 2009/0295232 | A1 | 12/2009 | McGinley et al. |
| 2009/0295233 | A1 | 12/2009 | McGinley et al. |
| 2009/0295327 | A1 | 12/2009 | McGinley et al. |
| 2009/0322160 | A1 | 12/2009 | Dubose et al. |
| 2011/0144824 | A1 | 6/2011 | Campesi et al. |

FOREIGN PATENT DOCUMENTS

| | | |
|---|---|---|
| DE | 4426509 | 2/1996 |
| GB | 2041588 | 9/1980 |
| JP | 0038587 | 3/1979 |
| JP | 4315964 | 11/1992 |
| JP | 8184616 | 7/1996 |
| WO | WO8605887 | 10/1986 |
| WO | WO9823019 | 5/1998 |
| WO | WO2004008649 | 1/2004 |

OTHER PUBLICATIONS

Hong Kong Electronics, vol. 5, Hong Kong Development Council 1996, 2 pages 1996.

Hong Kong Electronics, Hong Kong Development Council 1997, 2 pages. Aug. 1997.

Hong Kong Electronics, Hong Kong Development Council 1997, 2 pages. Oct. 1997.

Hong Kong Electronics, Hong Kong Development Council 1997, 2 pages. Dec. 1997.

Bluelounge—The Sanctuary; http://www.bluelounge.com/products/thesanctuary, 3 pgs. Retrieved Aug. 27, 2010.

Bluelounge—Extra Connectors. http://www.bluelounge.com/products/extra connectors, 3 pgs. Retrieved Aug. 27, 2010.

International Search Report for PCT Application No. PCT/US2011/020286, 14 pages, Mar. 15, 2011.

International Search Report for PCT Application No. PCT/US2011/039684, 11 pages, Sep. 26, 2011.

International Search Report for PCT Application No. PCT/US2009/041476, 10 pages, Feb. 27, 2012.

International Search Report and Written Opinion for PCT Application No. PCT/US2012/043412, 10 pages, Jan. 3, 2013.

* cited by examiner

US 8,742,943 B2

GROUND DETECTION CIRCUIT AND METHOD OF MANUFACTURING THE SAME

CROSS-REFERENCE TO RELATED APPLICATIONS

This application claims the benefit of U.S. Provisional Application Ser. No. 61/301,471, filed on Feb. 4, 2010, which is incorporated by reference herein in its entirety.

FIELD OF THE INVENTION

Subject matter described herein relates to power supply devices, and more particularly to universal ground detection functionality of power supplies for electronic devices.

DESCRIPTION OF THE BACKGROUND

Electronic devices of all types have become more and more common in everyday life. Electronic devices include non-portable devices as well as portable devices. Examples of non-portable electronic devices include computing devices (e.g., personal computers, laptops, etc.), wired telephones, routers (wired and wireless), wireless access points (WAPs), televisions, most large and small kitchen appliances, and the like. Examples of portable electronic devices include cellular phones, personal data assistants (PDAs), combination cellular phone and PDAs (e.g., a Blackberry® device available from Research in Motion (RIM®) of Ontario, Canada), cellular phone accessories (e.g., a Bluetooth® enabled wireless headset), MP3 (Moving Pictures Experts Group-1 Audio Layer 3) players (e.g., an iPod® device by Apple Inc. (Apple®) of Cupertino, Calif.), compact disc (CD) players, and digital video disk (DVD) players. Along with the positive benefits of use of such devices comes the requirement to power the devices.

Typically, users utilize power distribution devices (e.g., power strips, also called relocatable power taps) to provide power to operate or charge one or more of the aforementioned electronic devices as well as numerous other electronic devices. These power distribution devices typically include a power supply that provides power to one or more outlets. The power supplies for such power distribution devices may or may not incorporate surge protection.

Unfortunately, some jurisdictions in which a user may find herself do not provide grounded power (i.e., a power supply line incorporating a third line that is connected to earth ground) and therefore the power distribution devices receiving the ungrounded power may themselves pass ungrounded power to a user's electronic device. An electronic device having a grounded power circuit utilizing a grounded plug is less susceptible to damage from a surge event (e.g., lightening strike, local static electricity, etc.). Additionally, user safety is enhanced when a user is operating a device capable of utilizing grounded power because ungrounded power may electrocute a user. Unfortunately, utilizing a three-prong power outlet does not guarantee grounded power is present in a universal manner applicable to all regions of the world.

Therefore, a need exists for determining if available power is grounded (regardless of the world region) as well as to communicate such information to a user.

BRIEF DESCRIPTION OF THE DRAWINGS

To facilitate further description of the embodiments, the following drawings are provided in which.

Figure 1:
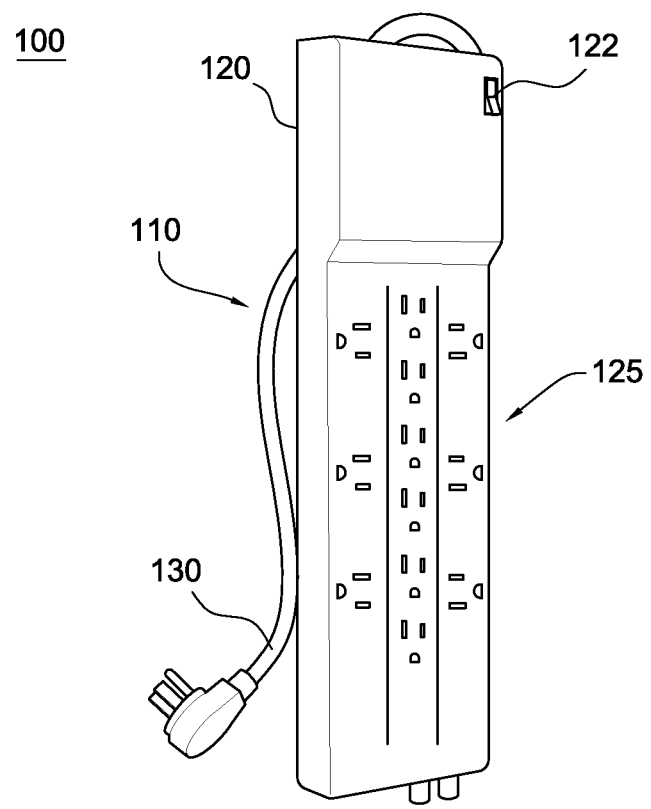
FIG. 1 illustrates an exemplary system, according to an embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments include a system comprising an electronic device. The electronic device comprises an electric power input configured to receive an electric power signal, the electric power input comprising an input line terminal and an input neutral terminal. In some embodiments, the electric power input can also comprise an input ground terminal. The electronic device comprises a metal oxide varistor protection module configured to protect at least one of the system or the electronic device. The electronic device comprises a ground detection module configured to indicate the presence of an electric ground. The electronic device comprises an electric power output comprising an output line terminal and an output neutral terminal. In some embodiments, the electric power output can also comprise an output ground terminal. In some embodiments, the electric power input, the metal oxide varistor protection module, the ground detection module, and the electric power output are electrically coupled in series with each other.

Various embodiments include a method of manufacturing a system. The method can comprise: providing an electronic device, the system comprising the electronic device, wherein providing the electronic device comprises: (a) providing an electric power input configured to receive an electric power signal, the electric power input comprising an input line terminal, an input ground terminal, and an input neutral terminal, (b) providing a metal oxide varistor protection module configured to protect at least one of the system or the electronic device, (c) providing a ground detection module configured to indicate the presence of an electric ground, (d) providing an electric power output comprising an output line terminal, an output ground terminal, and an output neutral terminal, and (e) coupling electrically in series the electric power input, the metal oxide varistor protection module, the ground detection module, and the electric power output with each other.

Further embodiments include a system comprising an electronic device. The electronic device comprises an electric power input configured to receive an electric power signal, the electric power input comprising an input line terminal and an input neutral terminal. In some embodiments, the electric power input can also comprise an input ground terminal. The electronic device comprises a metal oxide varistor protection module configured to protect at least one of the system or the electronic device. The electronic device comprises a ground detection module configured to indicate the presence of an electric ground. The electronic device comprises an electric power output comprising an output line terminal and an output neutral terminal. In many embodiments, the electric power output can also comprise an output ground terminal. In some embodiments, the metal oxide varistor protection module can comprise a circuit breaker comprising a first circuit breaker terminal and a second circuit breaker terminal, a first thermal link comprising a first first thermal link terminal and a second first thermal link terminal, a first fuse comprising a first first fuse terminal and a second first fuse terminal, a first metal oxide varistor comprising a first first metal oxide varistor terminal and a second first metal oxide varistor terminal, a second metal oxide varistor comprising a first second metal oxide varistor terminal and a second second metal oxide varistor terminal, a second fuse comprising a first second fuse terminal and a second second fuse terminal, a second thermal link comprising a first second thermal link terminal and a second second thermal link terminal, a third thermal link comprising a first third thermal link terminal and a second third thermal link terminal, a third fuse comprising a first third fuse terminal and a second third fuse terminal, a third metal oxide varistor comprising a first third metal oxide varistor terminal and a second third metal oxide varistor terminal, and a first crowbar circuit comprising a first first crowbar circuit terminal and a second first crowbar circuit terminal. In the same or different embodiments, the ground detection module can comprise a first diode comprising a first diode anode and a first diode cathode, a first resistive element comprising a first first resistive element terminal and a second first resistive element terminal, a second resistive element comprising a first second resistive element terminal and a second second resistive element terminal, a first transistor comprising a first transistor base, a first transistor emitter, and a first transistor collector, a third resistive element comprising a first third resistive element terminal and a second third resistive element terminal, a light emitting diode comprising a light emitting diode cathode and a light emitting diode anode, a second transistor comprising a second transistor base, a second transistor emitter, and a second transistor collector, a fourth resistive element comprising a first fourth resistive element terminal and a second fourth resistive element terminal, and a second diode comprising a second diode anode and a second diode cathode. In the same or different embodiments, the electronic device can comprise a first node electrically coupling the input line terminal and the first circuit breaker terminal; a second node electrically coupling the second circuit breaker terminal and the first first thermal link terminal; a third node electrically coupling the second first thermal link terminal, the first first crowbar circuit terminal, the first first fuse terminal, the first second metal oxide varistor terminal, the first diode anode, the first second resistive element terminal, the first transistor emitter, the light emitting diode cathode, and the output line terminal; a fourth node electrically coupling the second first fuse terminal, the second first crowbar circuit terminal, and the first first metal oxide varistor terminal; a fifth node electrically coupling the input neutral line, the third first crowbar circuit terminal, the second first metal oxide varistor terminal, the second third metal oxide varistor terminal, and the second diode anode; a sixth node electrically coupling the input ground terminal, the output ground terminal, the second second thermal link terminal, the second third thermal link terminal, and the second first resistive element terminal; a seventh node electrically coupling the second second metal oxide varistor terminal and the second second fuse terminal; an eighth node electrically coupling the first second fuse terminal and the first second thermal link terminal; a ninth node electrically coupling the first third thermal link terminal and the first third fuse terminal; a tenth node electrically coupling the second third fuse terminal and the first third metal oxide varistor terminal; an eleventh node electrically coupling the first diode cathode, the first first resistive element terminal, the second second resistive element terminal, and the first transistor base; a twelfth node electrically coupling the first transistor collector, the second transistor base, and the first third resistive element terminal; a thirteenth node electrically coupling the light emitting diode anode and the second transistor emitter; a fourteenth node electrically coupling the second transistor collector and the first fourth resistive element terminal; and a fifteenth node electrically coupling the second third resistive element terminal, the second fourth resistive element terminal, and the light emitting diode cathode. In the same or different embodiments, the first metal oxide transistor, the second metal oxide transistor, the third metal oxide transistor, and the first crowbar circuit can be configured for at least one of a root-mean-squared voltage of 330 volts or a root-mean-squared voltage of 130 volts. In the same or different embodiments, when the first metal oxide transistor, the second metal oxide transistor, the third metal oxide transistor, and the first crowbar circuit are configured for a root-mean-squared voltage of 330 volts, the first resistive element can comprise a first pair of resistors electrically coupled in series with each other, the third resistive element can comprise a second pair of resistors electrically coupled in series with each other, and the fourth resistive element comprises a third pair of resistors electrically coupled in series with each other.

FIG. 1 is a block diagram illustrating an embodiment of an exemplary system for providing a multi-outlet controlled power strip including multiple inputs, surge protection and incorporating a universal ground detect functionality. Surge protected power strip system 100 is merely exemplary and is not limited to the embodiments presented herein. Surge protected power strip system 100 can be employed in many different embodiments or examples not specifically depicted or described herein.

FIG. 1 includes power strip 110 (also called a relocatable power tap (RPT)), which includes enclosure 120 and power plug 130. Enclosure 120 includes indicator interface 122 and power receptacle array 125 as well as other circuitry detailed below, such as, for example, universal ground detect circuitry that generates and provides a ground detect signal to indicator interface 122. In one embodiment, indicator interface 122 includes one or more light emitting diodes (LEDs) to communicate its ground and power status to a user. In some embodiments, enclosure 120 additionally includes protection circuitry. Power strip circuitry including protection circuitry and universal ground detect circuitry is described in FIGS. 2-12, below. Power strip 110 may include additional elements not relevant to the present discussion.

Figure 2:
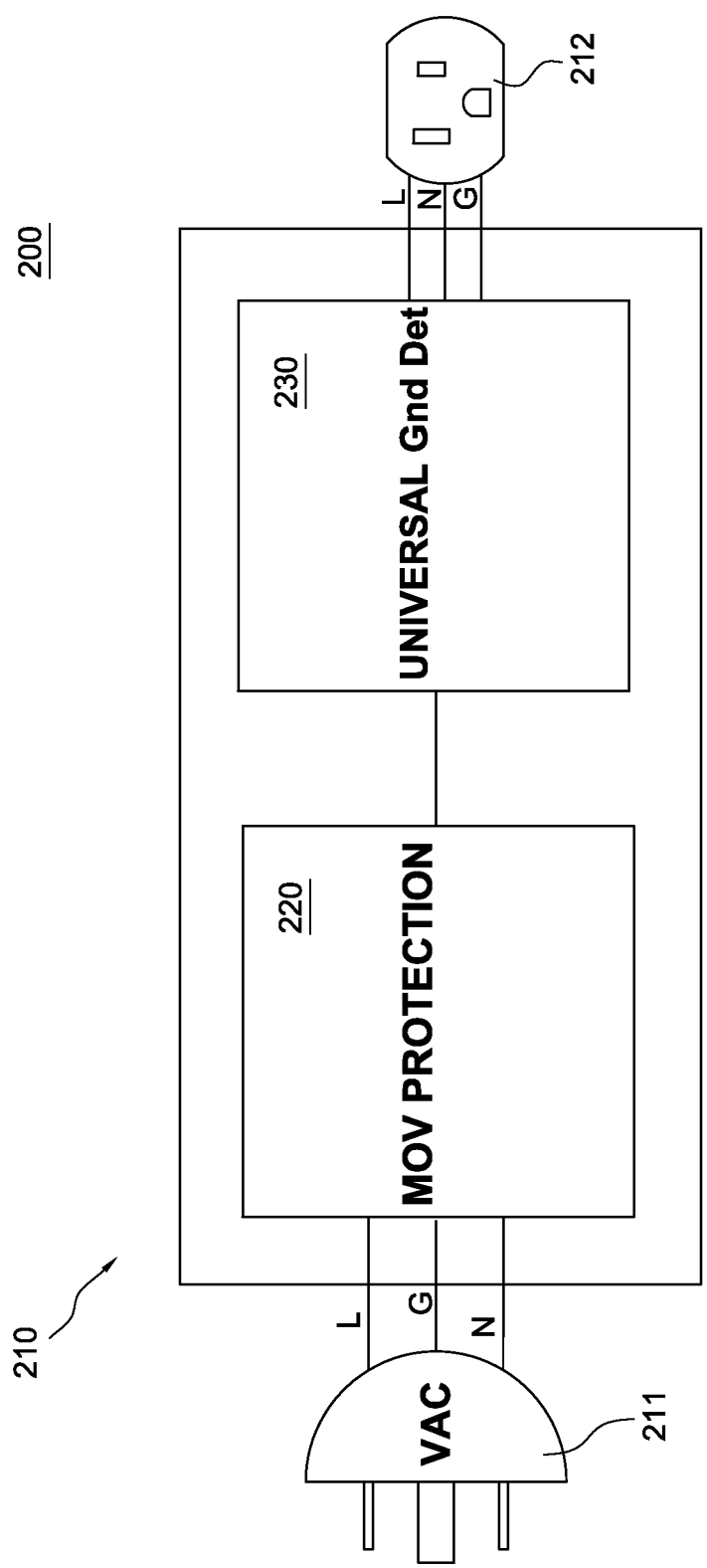
FIG. 2 is a block diagram illustrating the exemplary system of FIG. 1, according to an embodiment.

In operation, when power plug 130 is operably coupled to and in electrical communication with an appropriate power source (e.g., an alternating current (AC) or other power outlet fixture), power becomes available to components within enclosure 120. At this time, indicator interface 122 receives the ground detect signal from universal ground detect circuitry and communicates to a user that power plug 130 either is, or is not, plugged into an outlet that has a third line that is connected to earth ground. In some embodiments, the indication of the presence of ground is the absence of a specific glowing LED of indicator interface 122. In other embodiments, the indication of the presence of ground is the presence of a specific glowing LED of indicator interface 122. In yet another embodiment, the ground signal is at or near the potential of the neutral line. In still another embodiment, the ground signal is at or near the center potential of the two main power lines FIG. 2 is a block diagram illustrating an embodiment of an exemplary system for providing a multi-outlet power strip including surge protection and incorporating an improved power supply including universal ground detect functionality. The power strip 200 in FIG. 2 is a detailed view of power strip 100 of FIG. 1. Power strip 200 is merely exemplary and is not limited to the embodiments presented herein. Power strip 200 can be employed in many different embodiments or examples not specifically depicted or described herein.

As shown in FIG. 2, power strip 200 includes: protection circuit 210, power plug 211 and one or more outlet(s) 212. Protection circuit 210 includes metal oxide varistors (MOV) protection circuit 220 and universal ground detect (UGD) circuit 230. Power strip 200 may include additional elements not relevant to the present discussion.

MOV protection circuit 220 has an input and an output. The input of MOV protection circuit 220 is electrically coupled and in communication with power plug 211. The output of MOV protection circuit 220 is electrically coupled and in communication with UGD circuit 230. MOV protection circuit 220 receives power signals from power plug 211 and provides conditioned power signals to UGD circuit 230. An embodiment of MOV protection circuit 220 is described in FIG. 3, below. In operation, MOV protection circuit 220 conditions the received power signals to, among other things, reduce incoming radiated and conducted high frequency signals and noise, reduce the amplitude of incoming overvoltage spikes/surges, and provide protection for power strip 200 from defective MOV units within MOV protection circuit 220, as explained below. In short, MOV protection circuit 220 provides protected power to all other circuitry and outlets within power strip 200.

UGD circuit 230 has an input and an output. The input of UGD circuit 230 is electrically coupled and in communication with the output of MOV protection circuit 220. The output of UGD circuit 230 is electrically coupled and in communication with outlet(s) 212. UGD circuit 230 receives conditioned power signals from MOV protection circuit 220 and provides protected power signals to outlet(s) 212. In a different embodiment, power strip 200 includes multiple ones of UGD circuit 230 and multiple ones of outlets 212 such that each instance of UGD 230 is coupled to a different one of outlets 212, and vice versa. In another embodiment, the same UGD circuit 230 can be coupled to two or more outlets 212. In a further embodiment, power strip 200 can include multiple ones of MOV protection circuit 220 such that each instance of MOV protection circuit 220 is coupled to a different instance of UGD circuit 230, and vice versa. In another embodiment, the same MOV protection circuit can be coupled to two or more different instances of UGD circuit 230.

Additionally, UGD circuit 230 produces a ground signal and thus provides an indication, using an LED, when power strip 200 is plugged into an outlet that has a third line that is connected to earth ground. The indication in the presence of ground may be either the absence of the LED glowing or the LED glowing. That ground signal may be at or near the potential of the neutral line or it may be at the center potential of the two main power lines.

Figure 3:
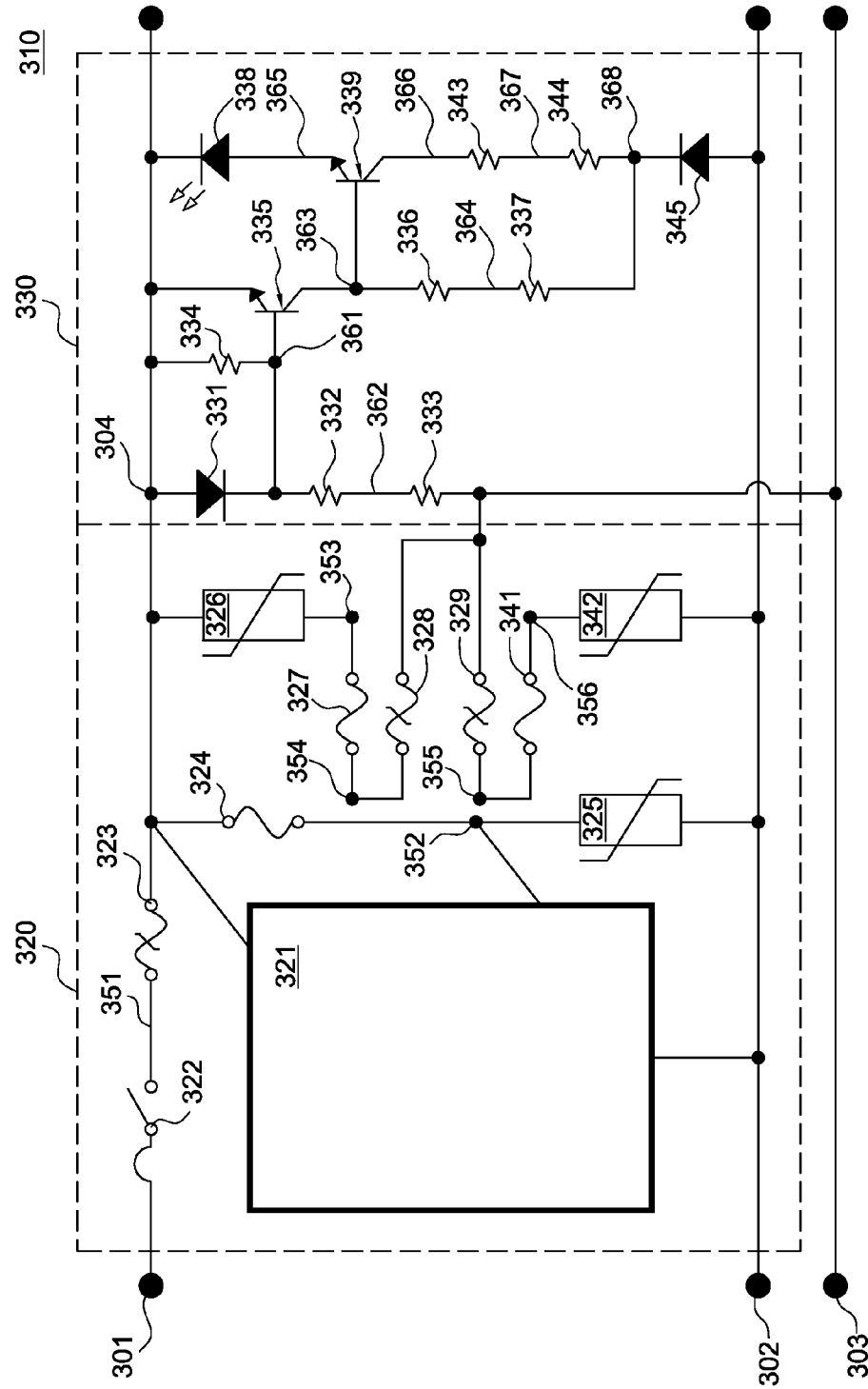
FIG. 3 is a circuit schematic diagram illustrating an embodiment of an exemplary protection circuit for the exemplary system of FIG. 2, according to an embodiment.

FIG. 3 is a circuit schematic diagram illustrating an embodiment of an exemplary protection circuit 310, such as, for example, protection circuit 210 of FIG. 2, above. Protection circuit 310 is merely exemplary and is not limited to the embodiments presented herein. Protection circuit 310 can be employed in many different embodiments or examples not specifically depicted or described herein.

Protection circuit 310 includes MOV protection circuit 320 and the universal ground detect (UGD) circuit 330. MOV protection circuit 320 has an input and an output. The input of MOV protection circuit 320 is electrically coupled and in communication with a power source via a power plug, such as, for example power plug 211 of FIG. 2, above. The output of MOV protection circuit 320 is electrically coupled and in communication with UGD circuit 330. In operation, MOV protection circuit 320 receives power signals from a power plug and provides conditioned power signals to UGD circuit 330. UGD circuit 330 has an input and an output. The input of UGD circuit 330 is electrically coupled and in communication with the output of MOV protection circuit 320. The output of UGD circuit 330 is electrically coupled and in communication with a user device via one or more outlets, such as, for example outlet(s) 212 of FIG. 2, below. In operation, UGD circuit 330 receives conditioned power signals from MOV protection circuit 320 and provides protected power signals to one or more outlets.

In one embodiment, MOV protection circuit 320 performs the functionality of MOV protection circuit 220 as described in FIG. 2, above. MOV protection circuit 320 can operate at a higher voltage rating (330 volts rms) and can operate at a higher input voltage (240V AC). In the same or a different embodiment, UGD circuit 330 performs the functionality of UGD circuit 230 as described in FIG. 2, above. Elements labeled as in FIG. 2, above, function in a substantially similar way. Protection circuit 310 may include additional elements not relevant to the present discussion.

In FIG. 3, protection circuit 310 additionally includes a line node 301, a neutral node 302 and a ground node 303 as well as numerous other nodes 304, 351-356, and 361-368. Node 301 is in electrical communication with a line voltage. Node 302 is in electrical communication with the neutral line. Node 303 is in electrical communication with ground.

In FIG. 3, circuit breaker 322 is located between line node 301 and node 351, and thermal link 323 is located between node 351 and node 304. Fuse 324 is located between node 304 and node 352, crowbar circuit 321 is located between nodes 304, 352, and 302, and metal oxide varistor (MOV) 325 is located between node 352 and neutral node 302. Crowbar circuit 321 is electrically coupled to node 352 by a signal line. MOV 326 is located between node 304 and node 353, fuse 327 is located between node 353 and node 354, and thermal link 328 is located between node 354 and ground node 303. Thermal link 329 is located between ground node 303 and node 355, fuse 341 is located between node 355 and node 356, and MOV 342 is located between node 356 and neutral node 302.

MOV protection circuit 320 performs the functionality as described in FIG. 2, above, for MOV protection circuit 220 by receiving raw power from a power source and providing protected power to the remainder of the elements within protection circuit 310, as explained below. The concepts underlying MOV protection circuit 320 are known in the art, and therefore, only certain portions of MOV protection circuit 320 will be described in detail herein. MOV protection circuit 320 includes Circuit Breaker 322 that protects against over current and short circuits. In MOV protection circuit 320, Metal Oxide Varistors (MOVs) 325, 326, and 342 reduce unwanted voltage spikes to acceptable levels. In this embodiment, the Metal Oxide Varistors (MOVs) are implemented as 330 volts root-mean-squared (rms) units, which allow safe operation at 240 volts (V) AC. In other embodiments, operating in different voltage environments results in the operating voltage of the MOVs to be chosen based on the operating environment requirements. Thermal link 323 and fuse 324 together form the input and output of a crowbar circuit 321 that senses when MOV 325 is no longer providing protection. Crowbar circuit 321 can be implemented as any suitable crowbar designed to sense when MOV 325 is faulty or fuse 324 is open, and forces thermal link 323 to open. An exemplary crowbar circuit is detailed in FIG. 11, below. Crowbar circuits are known in the art and will not be discussed further. When MOV 325 is no longer providing protection or when fuse 324 is open, this condition is called a fault condition. If crowbar circuit 321 senses a fault condition, crowbar circuit 321 is activated to completely and permanently disable the RPT (e.g., power strip or surge protect outlet strip) by forcing thermal link 323 to open. In one embodiment and illustrated in FIG. 3, each MOV is paired with an associated crow bar circuit. FIG. 3 illustrates a typical solution to these functions, but other functions may be implemented using different types of components. For example, MOVs may be replaced with TVSs (Transient Voltage Suppressors), and the crowbar circuit functionality might be implemented as an electronic fuse. As used with reference to all of the drawings, the term "MOV" can mean MOV and/or TVS.

In operation, line power is supplied to line node 301 (the line input) of MOV protection circuit 320 via a power cord, for example via power plug 211 of power strip 200 of FIG. 2, above. In one embodiment, circuit breaker 322 protects against any dead short conditions. The thermal cutoff of thermal link 323 is thermally linked to crowbar circuit 321. If a fault condition in MOV 325 or fuse 324 is sensed, crowbar circuit 321 activates thermal link 323 and causes thermal link 323 to open, thereby permanently removing power from the RPT-containing exemplary protection circuit 310.

In summary, the MOVs, thermal links and fuses protect against abnormal voltages and surge voltages, and the thermal links, in particular, can be used to prevent fires from starting from the device. More specifically, MOV 325 is the primary MOV. If a surge event occurs, MOV 325 will typically overheat and blow out first, before MOV 326 or MOV 342. If so, crowbar circuit 321 activates thermal link 323 can causes thermal link 323 to open. In other undesirable situations, MOV 326 and/or MOV 342 will overheat and blow out before MOV 325. In these other undesirable situations, if MOV 326 or MOV 342 fail before MOV 325 fails, then thermal fuse 328 or thermal fuse 329 will blow out before thermal fuse 323. As an example, these other undesirable situations include a high voltage drop occurring between a circuit board on which the MOVs and other components are mounted, on the one hand, and a metal case enclosing the components, on the other hand. In some embodiments, protection circuit 310 does not include MOV 342, thermal fuse 329, and fuse 341. In other embodiments, protection circuit 310 does not include MOV 326, thermal fuse 328, or fuse 327. In further embodiments, protection circuit 310 does not include MOV 326, thermal fuse 328, fuse 327, MOV 342, thermal fuse 329, and fuse 341. If protection circuit 310 includes MOV 326, thermal fuse 328, and fuse 327, then protection circuit 310 can include another crowbar circuit similar to circuit 321 that is coupled to sense the status of MOV 326 and fuse 327 is coupled to open thermal fuse 328 if either or both of MOV 326 and fuse 327 are blown open. Similarly, if protection circuit 310 includes MOV 342, thermal fuse 329, and fuse 341, then protection circuit 310 can include another crowbar circuit similar to circuit 321 that is coupled to sense the status of MOV 342 and fuse 341 is coupled to open thermal fuse 329 if either or both of MOV 342 and fuse 341 are blown open. In another embodiment where protection circuit 310 includes MOV 326, thermal fuse 328, and fuse 327 and/or MOV 342, thermal fuse 329, and fuse 341, a single crowbar circuit can be coupled to sense the status of MOV 325 and thermal link 323, as well as MOV 326 and thermal fuse 328 and/or MOV 342 and thermal fuse 329. The variations described in this paragraph can also be applied to the embodiments shown in FIGS. 4-10, below.

As another variation of the embodiment shown in FIG. 3 when the MOV protection circuit 320 is designed to operate at the higher voltage rating (330 volts rms) and is designed to operate at the higher input voltage (240V AC), any of thermal fuse 328 or 329 and/or fuses 327 or 341 can be omitted from MOV protection circuit 320 when MOV 326 and MOV 342 are included in MOV protection circuit 320. If thermal fuse 328 or 329 is omitted, then the crowbar circuit associated with the omitted thermal fuse can also be omitted from MOV protection circuit 320. As a further variation to the embodiment shown in FIG. 3, when MOV protection circuit 320 is designed to operation at the higher voltage rating (330 volts rms) and is designed to operate at the higher input voltage (240V AC), one or more of the thermal fuses can be replaced with a gas discharge tube. These variations for the higher voltage rating and higher voltage input of MOV protection circuit 320 can be applied to the embodiments shown in FIGS. 5, 7, and 9, below.

In FIG. 3, diode 331 includes an anode coupled to node 304 and a cathode coupled to node 361, resister 332 is located between node 361 and node 362, and resistor 333 is located between node 362 and ground node 303. Resistor 334 is located between node 304 and node 361. Bipolar Junction Transistor (BJT) 335 includes an emitter coupled to node 304, a base coupled to node 361 and a collector coupled to node 363. Resistor 336 is located between node 363 and node 364 and resistor 337 is located between node 364 and node 368. Light emitting diode (LED) 338 includes a cathode coupled to node 304 and an anode coupled to node 365. BJT 339 includes an emitter coupled to node 365, a base coupled to node 363 and a collector coupled to node 366. Resistor 343 is located between node 366 and node 367 and resistor 344 is located node 367 and node 368. Diode 345 includes a cathode coupled to node 368 and an anode coupled to neutral node 302. In an example, diode 331 can be implemented as an 1N4148 diode, resistors 332 and 333 can be implemented as 10MΩ resistors, resistor 334 can be implemented as a 1MΩ resistor, transistor 335 can be implemented as a 2N2222A BJT, resistors 336 and 337 can be implemented as 200 kΩ resistors, LED 338 can be implemented as any suitable light emitting diode (e.g., a Red LED), transistor 339 can be implemented as a A44 BJT, resistors 343 and 344 can be implemented as 30 kΩ (0.5 W) resistors, and diode 338 can be implemented as an 1N4007 diode.

As detailed above, universal ground detect (UGD) 330 includes diodes 331, 338 and 345, transistors 335 and 339, and resistors 332-334, 336 and 337, and 343 and 344 together form the ground detect circuit. In FIG. 3, transistors 335 and 339 and their components indicate if ground is present. If no ground is present, light emitting diode (LED) 338 lights to show a fault. Although the components of UDG circuit 330 of FIG. 3 are presented in a specific embodiment, it is important to understand that other configurations of the elements of UDG circuit 330 will provide the same functionality. In some embodiments there may be additional elements or less elements depending on the sum total of the components used to achieve the functionality of UDG circuit 330. For example, discrete transistor circuits may use integrated circuitry, and the LED may be replaced by any type of indictor or may be a signal used to activate some other device such as a computer.

In operation, diode 345 provides DC power for the circuit, and diode 331 prevents any reverse bias from entering the base of transistor 335. If a connection to ground is present at ground node 303 (the line input), the combination of resistors 332 and 333 pull the base of transistor 335 high thereby causing transistor 335 to conduct. This event brings the base potential of transistor 339 close to the emitter potential of transistor 339 thereby removing power from LED 338. At this point, LED 338 is not lit and does not indicate loss of ground. In this embodiment, resistor 334 insures transistor 335 shuts off when no ground signal is present at ground node 303 (i.e., resistor 334 counters Icbo, which is current that leaks from the collector of transistor 335 to the base of transistor 335 and could potentially turn on transistor 335 when no ground signal is present). With transistor 335 not conducting in the absence of a ground signal at ground node 303, bias current is supplied through resistors 336 and 337 to the base of transistor 339 causing transistor 339 to conduct. This condition now provides a current path for the LED 338 traced through diode 345, transistor 339, and resistors 343 and 344, thereby causing LED 338 to light up indicating the absence of a ground connection at ground node 303. In one embodiment, the associated pairs of resistors (i.e., 332 and 333, 336 and 337, and 343 and 344) are used instead of a single resistor because it can be easier to find and less expensive to use 200 V rated resistors at the resistance or ohm level specified in FIG. 3 than at double the specified resistance or ohm levels.

The advantages of this design can be three fold. First, as stated earlier, this circuit is universal because it can detect ground even if ground is not at the same potential as neutral (e.g., as with some countries that have ground half way between both lines). Second, it puts very little bias current into ground (<10 micro Amperes (uA)), again, as required by certain countries. Third, it uses little vampire power (<40 milliWatts (mW)) when not showing a fault condition.

Figure 4:
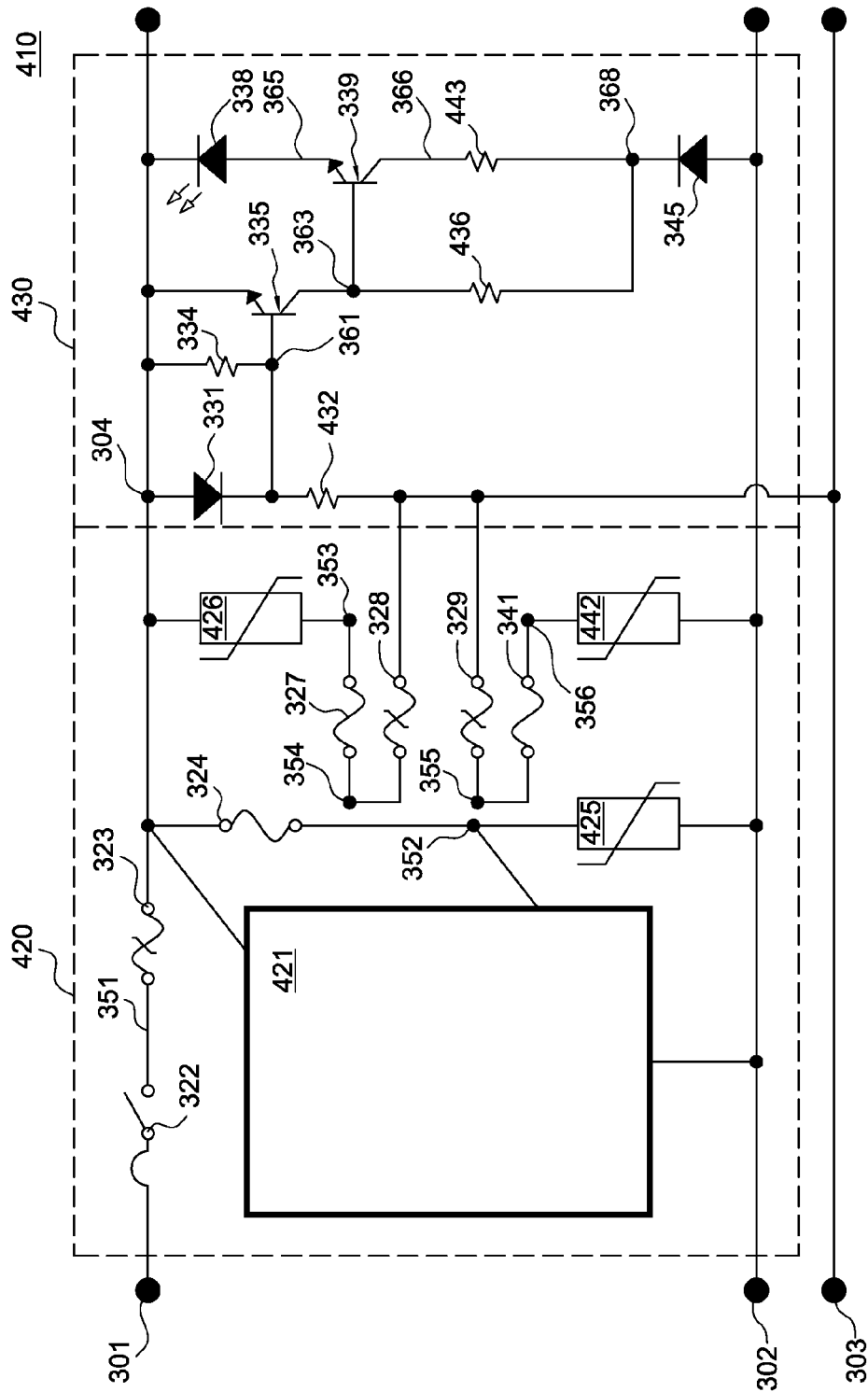
FIG. 4 is a circuit schematic diagram illustrating an embodiment of an exemplary protection circuit of FIG. 2, according to another embodiment.

FIG. 4 is a circuit schematic diagram illustrating an embodiment of an exemplary protection circuit 410, such as, for example, protection circuit 210 of FIG. 2, above. Protection circuit 410 is merely exemplary and is not limited to the embodiments presented herein. Protection circuit 410 can be employed in many different embodiments or examples not specifically depicted or described herein.

Protection circuit 410 includes MOV protection circuit 420 and the universal ground detect (UGD) circuit 430. In one embodiment, MOV protection circuit 420 performs the functionality of MOV protection circuit 220 as described in FIG. 2, above. In the same or a different embodiment, UGD circuit 430 performs the functionality of UGD circuit 230 as described in FIG. 2, above. In one embodiment, MOV protection circuit 420 is substantially similar to MOV protection circuit 320 of FIG. 3, above, except for a lower voltage rating (130 volts rms versus 330 volts rms) to operate at a lower input voltage (120V AC versus 240V AC). Elements labeled as in FIGS. 2 and 3, above, function in a substantially similar way. Protection circuit 410 may include additional elements not relevant to the present discussion.

As described above, protection circuit 410 includes MOV protection circuit 420 and the universal ground detect (UGD) circuit 430. MOV protection circuit 420 has an input and an output. The input of MOV protection circuit 420 is electrically coupled and in communication with a power source via a power plug, such as, for example power plug 211 of FIG. 2, above. The output of MOV protection circuit 420 is electrically coupled and in communication with UGD circuit 430. In operation, MOV protection circuit 420 receives power signals from a power plug and provides conditioned power signals to UGD circuit 430. UGD circuit 430 has an input and an output. The input of UGD circuit 430 is electrically coupled and in communication with the output of MOV protection circuit 420. The output of UGD circuit 430 is electrically coupled and in communication with a user device via one or more outlets, such as, for example outlet(s) 212 of FIG. 2, below. In operation, UGD circuit 430 receives conditioned power signals from MOV protection circuit 420 and provides protected power signals to one or more outlets.

In one embodiment, MOV protection circuit 420 performs the functionality of MOV protection circuit 220 as described in FIG. 2, above. MOV protection circuit 420 operates at lower voltage rating (130 volts rms) and operates at lower input voltage (120V AC). In the same or a different embodiment, UGD circuit 430 performs the functionality of UGD circuit 230 as described in FIG. 2, above.

In FIG. 4, protection circuit 410 additionally includes a line node 301, a neutral node 302 and a ground node 303 as well as numerous other nodes 304, 351-356, and 361, 363, 365, 366 and 368. Node 301 is in electrical communication with a line voltage. Node 302 is in electrical communication with the neutral line. Node 303 is in electrical communication with ground.

In FIG. 4, circuit breaker 322 is located between line node 301 and node 351, and thermal link 323 is located between node 351 and node 304. Fuse 324 is located between node 304 and node 352, crowbar circuit 421 is located between nodes 304, 352 and, 302, and metal oxide varistor (MOV) 425 is located between node 352 and neutral node 302. Crowbar circuit 421 is electrically coupled to node 352 by a signal line. MOV 426 is located between node 304 and node 353, fuse 327 is located between node 353 and node 354, and thermal link 328 is located between node 354 and ground node 303. Thermal link 329 is located between ground node 303 and node 355, fuse 341 is located between node 355 and node 356, and MOV 442 is located between node 356 and neutral node 302.

MOV protection circuit 420 performs the functionality as described in FIG. 2, above, for MOV protection circuit 220 by receiving raw power from a power source and providing protected power to the remainder of the elements within protection circuit 410. The concepts underlying MOV protection circuit 420 are known in the art, and therefore, only certain portions of MOV protection circuit 420 will be described herein. MOV protection circuit 420 includes Circuit Breaker 322 that protects against over current and short circuits. In MOV protection circuit 420, Metal Oxide Varistors (MOVs) 425, 426, and 442 reduce unwanted voltage spikes to acceptable levels. In this embodiment, the Metal Oxide Varistors (MOVs) are implemented as 130 volts rms units, which allow safe operation at 120V AC. In other embodiments, operating in different voltage environments results in the operating voltage of the MOVs to be chosen based on the operating environment requirements. Thermal link 323 and fuse 324 together form the input and output of a crowbar circuit 421 that senses when MOV 425 is no longer providing protection. This condition is called a fault condition. Crowbar circuit 421 can be implemented as any suitable crowbar designed to sense when MOV 425 is faulty or fuse 324 is open, and forces thermal link 323 to open. An exemplary crowbar circuit is detailed in FIG. 12, below. If a fault condition is sensed, crowbar circuit 421 is activated to completely and permanently disable the RPT (e.g., power strip or surge protect outlet strip). FIG. 4 illustrates a typical solution to these functions, but other functions maybe implemented using different types of components. For example, the crowbar circuit functionality might be implemented as an electronic fuse.

In operation, line power is supplied to line node 301 (the line input) via a power cord, for example via power plug 211 of power strip 200 of FIG. 2, above. In one embodiment, circuit breaker 322 protects against any dead short conditions. The thermal cutoff of thermal link 323 is thermally linked to crowbar circuit 421. If a fault condition in MOV 425 or fuse 324 is sensed, crowbar circuit 421 activates 323 and causes thermal link 323 to open, thereby permanently removing power from the RPT-containing exemplary protection circuit 410. In summary, the MOVs, thermal links and fuses protect against abnormal voltages, and surge voltages.

In FIG. 4, diode 331 includes an anode coupled to node 304 and a cathode coupled to node 361, resister 432 is located between node 361 and ground node 303. Resistor 334 is located between node 304 and node 361. BJT 335 includes an emitter coupled to node 304, a base coupled to node 361 and a collector coupled to node 363. Resistor 436 is located between node 363 and node 368. Light emitting diode (LED) 338 includes a cathode coupled to node 304 and an anode coupled to node 365. BJT 339 includes an emitter coupled to node 365, a base coupled to node 363 and a collector coupled to node 366. Resistor 443 is located between node 366 and node 368. Diode 345 includes a cathode coupled to node 368 and an anode coupled to neutral node 302. In an example, diode 331 can be implemented as an 1N4148 diode, resistor 432 can be implemented as 10MΩ resistor, resistor 334 can be implemented as a 1MΩ resistor, transistor 335 can be implemented as a 2N2222A BJT, resistor 436 can be implemented as 200 kΩ resistor, LED 338 can be implemented as any suitable light emitting diode (e.g., a red LED), transistor 339 can be implemented as a A44 BJT, resistor 436 can be implemented as 30 kΩ (0.5 W) resistor, and diode 338 can be implemented as an 1N4007 diode.

As detailed above, UGD circuit 430 includes diodes 331, 338 and 345, transistors 335 and 339, and resistors 432, 334, 436 and 443 together form the ground detect circuit. In FIG. 4, transistors 335 and 339 and their components indicate if ground is present. If no ground is present, light emitting diode (LED) 338 lights to show a fault. Although the components of UDG circuit 430 of FIG. 4 are presented in a specific embodiment, it is important to understand that other configurations of the elements of UDG circuit 430 will provide the same functionality. In one example, resistor 432 performs the functionality of resistors 332 and 333 in FIG. 3, above. In another example, resistor 436 performs the functionality of resistors 336 and 337 in FIG. 3, above. In still another example, resistor 443 performs the functionality of resistors 366 and 367 in FIG. 3, above. In some embodiments there may be additional elements or less elements depending on the sum total of the components used to achieve the functionality of UDG circuit 430. For example, discrete transistor circuits may use integrated circuitry, and the LED may be replaced by any type of indictor or may be a signal used to activate some other device such as a computer.

In operation, diode 345 provides DC power for the circuit, and diode 331 prevents any reverse bias from entering the base of transistor 335. If a connection to ground is present at ground node 303 (the line input), resistor 432 pulls the base of transistor 335 high thereby causing transistor 335 to conduct. This event brings the base potential of transistor 339 close to the emitter potential of transistor 339 thereby removing power from the LED 338. At this point, LED 338 is not lit and does not indicate loss of ground. In this embodiment, resistor 334 insures transistor 335 shuts off when no ground signal is present at ground node 303 (i.e., resistor 334 counters Icbo, which is current that leaks from the collector of transistor 335 to the base of transistor 335 and could potentially turn on transistor 335 when no ground signal is present). With transistor 335 not conducting in the absence of a ground signal at ground node 303, bias current is supplied through resistor 436 to the base of transistor 339 causing transistor 339 to conduct. This condition now provides a current path for the LED 338 traced through diode 345, transistor 339, and resistor 443, thereby causing LED 338 to light up indicating the absence of a ground connection at ground node 303. The advantages of this design are described in FIG. 3, above.

Figure 5:
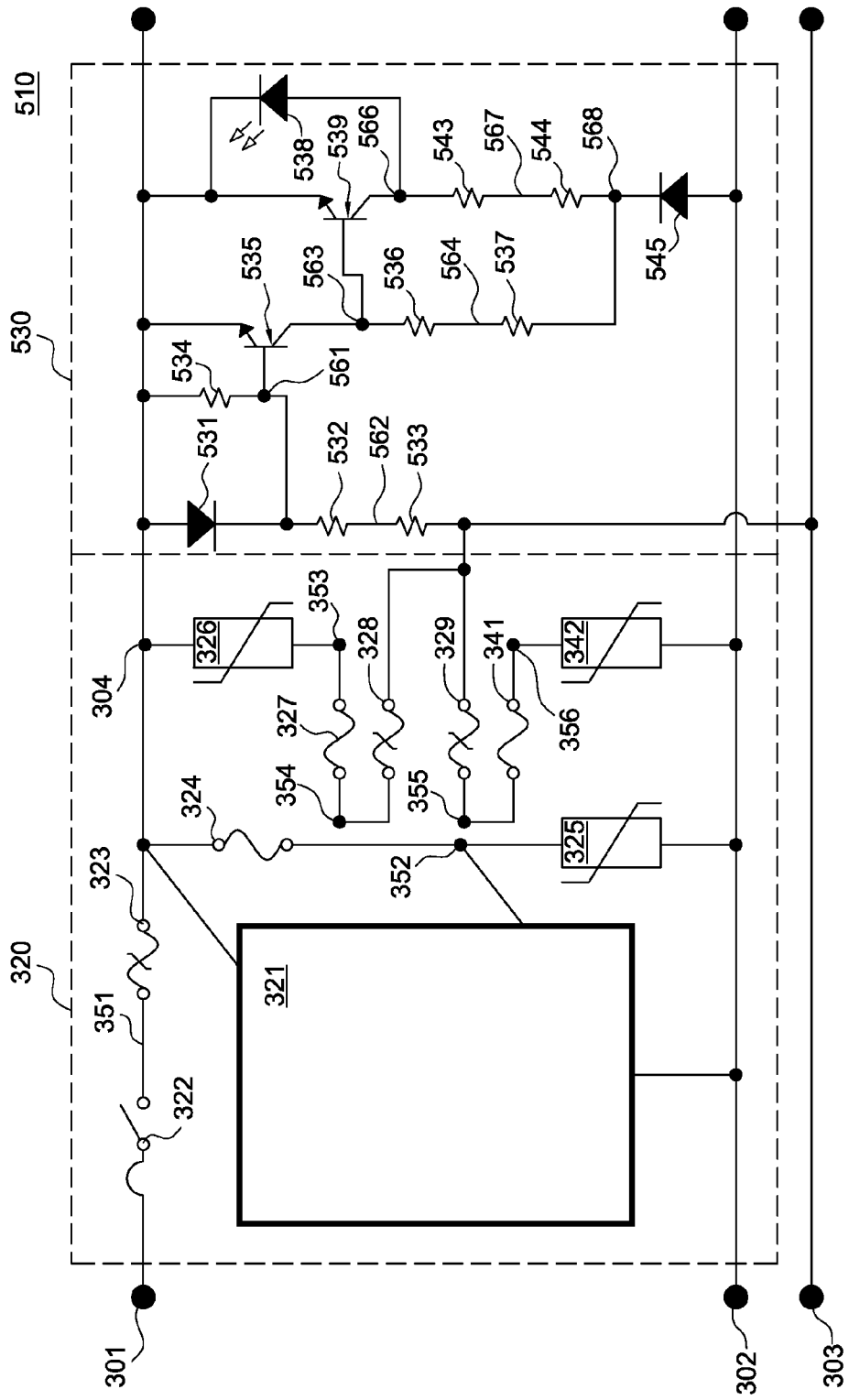
FIG. 5 is a circuit schematic diagram illustrating an embodiment of an exemplary protection circuit of FIG. 2, according to another embodiment.

FIG. 5 is a circuit schematic diagram illustrating an embodiment of an exemplary protection circuit 510, such as, for example, protection circuit 210 of FIG. 2, above. Protection circuit 510 is merely exemplary and is not limited to the embodiments presented herein. Protection circuit 510 can be employed in many different embodiments or examples not specifically depicted or described herein.

Protection circuit 510 includes MOV protection circuit 320 and the universal ground detect (UGD) circuit 530. In one embodiment, MOV protection circuit 320 is implemented as MOV protection circuit 320 of FIG. 3, above, and performs the functionality of MOV protection circuit 220 as described in FIG. 2, above. MOV protection circuit 320 can operate at a higher voltage rating (330 volts rms) and can operate at a higher input voltage (240V AC). In the same or a different embodiment, UGD circuit 530 performs the functionality of UGD circuit 230 as described in FIG. 2, above. Elements labeled as in FIGS. 2-4, above, function in a substantially similar way. Protection circuit 510 may include additional elements not relevant to the present discussion.

As described above, protection circuit 510 includes MOV protection circuit 320 and the universal ground detect (UGD) circuit 530. MOV protection circuit 320 has an input and an output. The input of MOV protection circuit 320 is electrically coupled and in communication with a power source via a power plug, such as, for example power plug 211 of FIG. 2, above. The output of MOV protection circuit 320 is electrically coupled and in communication with UGD circuit 530. In operation, MOV protection circuit 320 receives power signals from a power plug and provides conditioned power signals to UGD circuit 530. UGD circuit 530 has an input and an output. The input of UGD circuit 530 is electrically coupled and in communication with the output of MOV protection circuit 320. The output of UGD circuit 530 is electrically coupled and in communication with a user device via one or more outlets, such as, for example outlet(s) 212 of FIG. 2, below. In operation, UGD circuit 530 receives conditioned power signals from MOV protection circuit 320 and provides protected power signals to one or more outlets.

In FIG. 5, protection circuit 510 additionally includes a line node 301, a neutral node 302 and a ground node 303 as well as numerous other nodes 304, 351-356, 561-564, and 566-568. Node 301 is in electrical communication with a line voltage. Node 302 is in electrical communication with the neutral line. Node 303 is in electrical communication with ground.

In operation, line power is supplied to line node 301 (the line input) of MOV protection circuit 320 via a power cord, for example via power plug 211 of power strip 200 of FIG. 2, above. In one embodiment, circuit breaker 322 protects against any dead short conditions. The thermal cutoff of thermal link 323 is thermally linked to crowbar circuit 321. If a fault condition in MOV 325 or fuse 324 is sensed, crowbar circuit 321 activates thermal link 323 and causes thermal link 323 to open, thereby permanently removing power from the RPT-containing exemplary protection circuit 310. In summary, the MOVs, thermal links and fuses of MOV protection circuit 320 protect against abnormal voltages, and surge voltages.

In UGD circuit 530 of FIG. 5, diode 531 includes an anode coupled to node 304 and a cathode coupled to node 561, resister 532 is located between node 561 and node 562, and resistor 533 is located between node 562 and ground node 303. Resistor 534 is located between node 304 and node 561. BJT 535 includes an emitter coupled to node 304, a base coupled to node 561 and a collector coupled to node 563. Resistor 536 is located between node 563 and node 564, and resistor 537 is located between node 564 and node 568. BJT 539 includes an emitter coupled to node 304, a base coupled to node 563 and a collector coupled to node 566. Light emitting diode (LED) 538 includes a cathode coupled to node 304 and an anode coupled to node 566. Resistor 543 is located between node 566 and node 567 and resistor 544 is located node 567 and node 568. Diode 545 includes a cathode coupled to node 568 and an anode coupled to neutral node 302. In an example, diode 531 can be implemented as an 1N4148 diode, resistors 532 and 533 can be implemented as 10MΩ resistors, resistor 534 can be implemented as a 1MΩ resistor, transistor 535 can be implemented as a 2N2222A BJT, resistors 536 and 537 can be implemented as 200 kΩ resistors, LED 538 can be implemented as any suitable light emitting diode (e.g., a Green LED), transistor 539 can be implemented as a 2N2222A BJT, resistors 543 and 544 can be implemented as 30 kΩ (0.5 W) resistors, and diode 538 can be implemented as an 1N4007 diode.

In FIG. 5, UGD circuit 530 is configured similar to UDG circuit 330 of FIG. 3, above. UDG circuit 530 includes diodes 531, 538, and 545, transistors 535 and 539, and resistors 532-534, 536 and 537, and 543 and 544, forming the ground detect circuit. Transistors 535 and 539 can function in a similar manner to transistors 335 and 339, respectively, in FIGS. 3 and 4. Diode 531 prevents any reverse bias from entering the base of transistor 535, and diode 538 is implemented as a light emitting diode (LED). In FIG. 5, diode 538 is configured differently from the LED configurations of FIGS. 3 and 4 as LED 538 is configured in parallel with transistor 539 instead of in series with the transistor as UDG circuit 330 of FIG. 3 and UDG circuit 430 of Figure are configured. The configuration of UDG circuit 530 in FIG. 5 results in the indicator (e.g., the LED as implemented by diode 538) being on when ground is present at ground node 303 (the line input). This circuit retains the advantage of universal ground detection and low ground bias current but loses the low power consumption advantage described for earlier embodiments.

In operation, diode 545 provides DC power for the circuit, and diode 531 prevents any reverse bias from entering the base of transistor 535. If a connection to ground is present at ground node 303 (the line input), the combination of resistors 532 and 533 pull the base of transistor 535 high thereby causing transistor 535 to conduct. This event brings the base potential of transistor 539 close to the emitter potential of transistor 539, turning off transistor 539, and thus allowing current to flow through LED 538, also called diode 538, via diode 545 and resistors 543 and 544. LED 538 is now lit and indicates the circuit is properly grounded. In this embodiment, resistor 534 ensures transistor 535 shuts off when a ground signal is not present at ground node 303 (i.e., resistor R1 counters Icbo, which is current that leaks from the collector of transistor 535 to the base of transistor 535 and could potentially turn transistor 535 on when a ground signal is not present). With transistor 535 not conducting in the absence of a ground signal at ground node 303 (the line input), bias current is supplied through resistors 536 and 537 to the base of transistor 539, and transistor 539 then conducts. When transistor 539 conducts, the current path for LED 538 is interrupted. When the current path for LED 538 is interrupted, LED 538 extinguishes indicating the absence of a ground connection at ground node 303 (the line input). In one embodiment, the pairs of resistors (i.e., 532 and 533, 536 and 537, and 543 and 544) are used, instead of a single resistor because it can be easier to find and less expensive to use 200 V rated resistors at the resistance or ohm level specified in FIG. 3 than at double the specified resistance or ohm levels.

In FIG. 5, the UDG 530 circuit configuration includes two additional advantages. First, a lower voltage transistor can be used for transistor 539 vice transistor 339 of FIG. 3 above, saving some cost over UGD circuit 330 of FIG. 3. Second, the user sees the indicator on when ground is present (e.g., green LED 538) versus a red indicator (e.g., red LED 338) when ground is not present.

Figure 6:
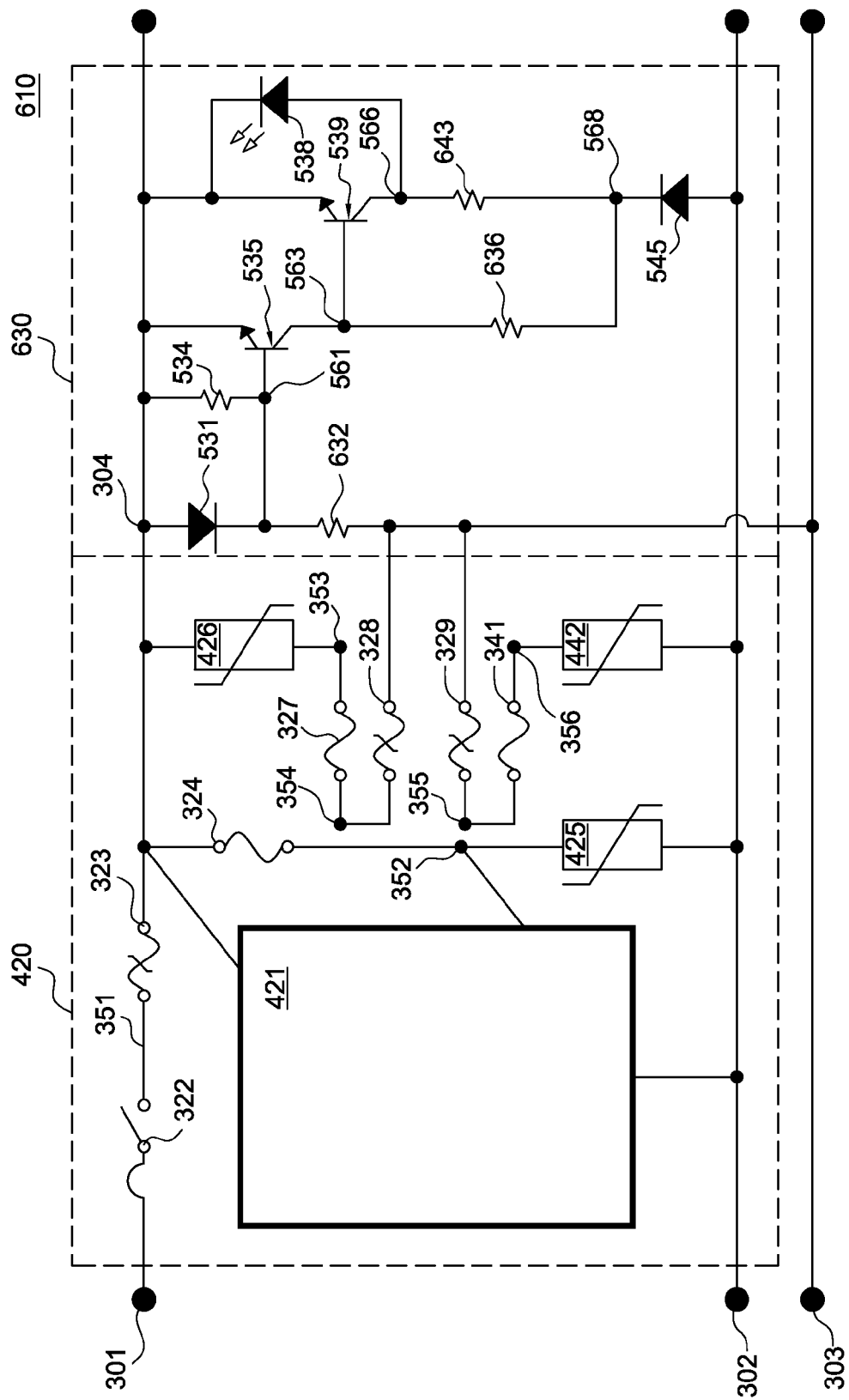
FIG. 6 is a circuit schematic diagram illustrating an embodiment of an exemplary protection circuit of FIG. 2, according to another embodiment.

FIG. 6 is a circuit schematic diagram illustrating an embodiment of an exemplary protection circuit 610, such as, for example, protection circuit 210 of FIG. 2, above. Protection circuit 610 is merely exemplary and is not limited to the embodiments presented herein. Protection circuit 610 can be employed in many different embodiments or examples not specifically depicted or described herein.

Protection circuit 610 includes MOV protection circuit 420 and universal ground detect (UGD) circuit 630. In one embodiment, MOV protection circuit 420 performs the functionality of MOV protection circuit 220 as described in FIG. 2, above. In the same or a different embodiment, UGD circuit 630 performs the functionality of UGD circuit 230 as described in FIG. 2, above. In one embodiment, MOV protection circuit 420 is substantially similar to MOV protection circuit 320 of FIG. 3, above, except for a lower voltage rating (130 volts rms versus 330 volts rms) to operate at a lower input voltage (120V AC versus 240V AC). Elements labeled as in FIGS. 3-5 above function in a substantially similar way. Protection circuit 610 may include additional elements not relevant to the present discussion.

As described above, protection circuit 610 includes MOV protection circuit 420 and the universal ground detect (UGD) circuit 630. MOV protection circuit 420 has an input and an output. The input of MOV protection circuit 420 is electrically coupled and in communication with a power source via a power plug, such as, for example power plug 211 of FIG. 2, above. The output of MOV protection circuit 420 is electrically coupled and in communication with UGD circuit 630. In operation, MOV protection circuit 420 receives power signals from a power plug and provides conditioned power signals to UGD circuit 630. UGD circuit 630 has an input and an output. The input of UGD circuit 630 is electrically coupled and in communication with the output of MOV protection circuit 420. The output of UGD circuit 630 is electrically coupled and in communication with a user device via one or more outlets, such as, for example outlet(s) 212 of FIG. 2, below. In operation, UGD circuit 630 receives conditioned power signals from MOV protection circuit 420 and provides protected power signals to one or more outlets.

As also described above, MOV protection circuit 420 can operate at a lower voltage rating (130 volts rms) and can operate at a lower input voltage (120V AC). In the same or a different embodiment, UGD circuit 630 performs the functionality of UGD circuit 230 as described in FIG. 2, above. It should be noted that the primary difference between UDG circuit 630 and UDG circuit 530 of FIG. 5 is that UDG circuit 630 is designed to operate at 120V AC instead of 230V AC.

In FIG. 6, protection circuit 610 additionally includes a line node 301, a neutral node 302 and a ground node 303 as well as numerous other nodes 304, 351-356, and 561, 563, 566 and 568. Node 301 is in electrical communication with a line voltage. Node 302 is in electrical communication with the neutral line. Node 303 is in electrical communication with ground.

In operation, line power is supplied to line node 301 (the line input) of MOV protection circuit 420 via a power cord, for example via power plug 211 of power strip 200 of FIG. 2, above. In one embodiment, circuit breaker 322 protects against any dead short conditions. The thermal cutoff of thermal link 323 is thermally linked to crowbar circuit 421. If a fault condition in MOV 425 or fuse 324 is sensed, crowbar circuit 421 activates thermal link 323 and causes thermal link 323 to open, thereby permanently removing power from the RPT-containing exemplary protection circuit 310. In summary, the MOVs, thermal links and fuses of MOV protection circuit 420 protect against abnormal voltages, and surge voltages.

In UGD circuit 630 of FIG. 6, diode 531 includes an anode coupled to node 304 and a cathode coupled to node 561, resister 632 is located between node 561 and ground node 303. Resistor 534 is located between node 304 and node 561. BJT 535 includes an emitter coupled to node 304, a base coupled to node 561 and a collector coupled to node 563. Resistor 636 is located between node 563 and node 568. BJT 539 includes an emitter coupled to node 304, a base coupled to node 563 and a collector coupled to node 566. Light emitting diode (LED) 538 includes a cathode coupled to node 304 and an anode coupled to node 566. Resistor 543 is located between node 566 and node 568. Diode 545 includes a cathode coupled to node 568 and an anode coupled to neutral node 302. In an example, diode 531 can be implemented as an 1N4148 diode, resistor 632 can be implemented as a 10MΩ resistor, resistor 534 can be implemented as a 1MΩ resistor, transistor 535 can be implemented as a 2N2222A BJT, resistor 636 can be implemented as a 200 kΩ resistor, LED 538 can be implemented as any suitable light emitting diode (e.g., a green LED), transistor 539 can be implemented as a 2N2222A BJT, resistor 643 can be implemented as a 30 kΩ (0.5 W) resistor, and diode 545 can be implemented as an 1N4007 diode.

In FIG. 6, UGD circuit 630 is configured substantially similarly to UDG 530 of FIG. 5, above. UDG circuit 630 includes diodes 531, 538, and 545, transistors 535 and 539, and resistors 632, 636, and 643 forming the ground detect circuit. Transistors 535 and 539 can function in a similar manner to transistors 335 and 339, respectively, in FIGS. 3 and 4. Diode 531 prevents any reverse bias from entering the base of transistor 535, and diode 538 is implemented as a light emitting diode (LED). In FIG. 5, diode 538 is configured in parallel with transistor 539 instead of in series with the transistor as UDG circuit 330 of FIG. 3 and UDG 430 of FIG. 4 are configured. The configuration of UDG circuit 630 in FIG. 5 results in the indicator (e.g., the LED as implemented by diode 538) to be on when ground is present at ground node 303 (the line input). As in FIG. 5 above, this circuit retains the advantage of universal ground detection and low ground bias current, but loses the low power consumption advantage described for earlier embodiments.

In operation, diode 545 provides DC power for the circuit, and diode 531 prevents any reverse bias from entering the base of transistor 535. If a connection to ground is present at ground node 303 (the line input), resistor 632 pulls the base of transistor 535 high thereby causing transistor 535 to conduct. This event brings the base potential of transistor 539 close to the emitter potential of transistor 539, turning off transistor 539, and thus allowing current to flow through LED 538, also called diode 538, via diode 545 and resistor 643. LED 538 is now lit and indicates the circuit is properly grounded. In this embodiment, resistor 534 insures transistor 535 shuts off when a ground signal is not present at ground node 303 (i.e., resistor R1 counters Icbo, which is current that leaks from the collector of transistor 535 to the base of transistor 535 and could potentially turn transistor 535 on when a ground signal is not present). With transistor 535 not conducting in the absence of a ground signal at ground node 303 (the line input), bias current is supplied through resistor 636 to the base of transistor 539, and transistor 539 then conducts. When transistor 539 conducts, the current path for LED 538 is interrupted.

In FIG. 6, the UDG circuit 630 configuration includes two additional advantages. First, a lower voltage transistor can be used for transistor 539, saving some cost over UGD circuit 430 of FIG. 4. Second, the user sees the indicator on when ground is present (e.g., green LED 538) versus a red indicator (e.g., red LED 338) when ground is not present.

Figure 7:
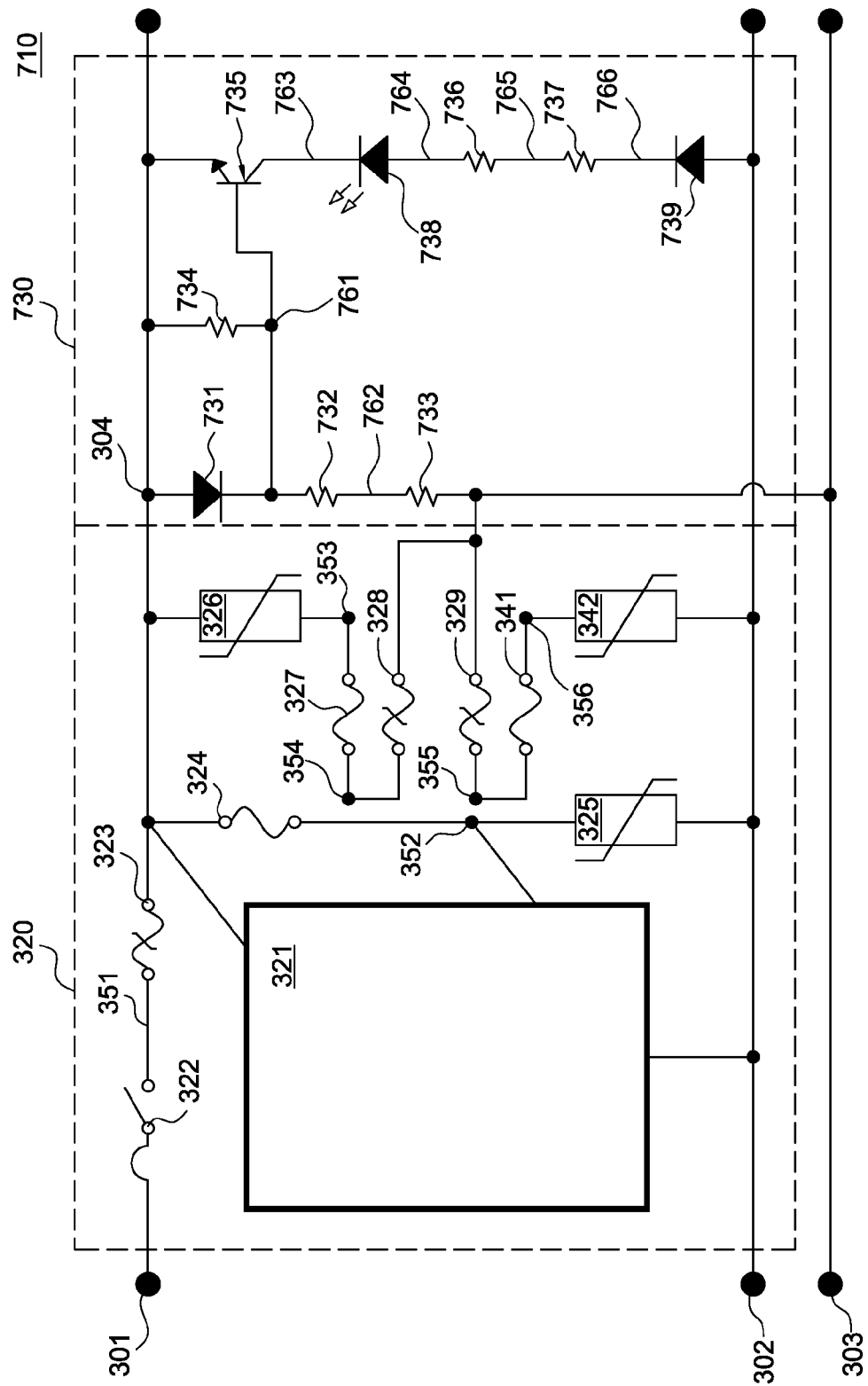
FIG. 7 is a circuit schematic diagram illustrating an embodiment of an exemplary protection circuit of FIG. 2, according to another embodiment.

FIG. 7 is a circuit schematic diagram illustrating an embodiment of an exemplary protection circuit 710, such as, for example, protection circuit 210 of FIG. 2, above. Protection circuit 710 is merely exemplary and is not limited to the embodiments presented herein. Protection circuit 710 can be employed in many different embodiments or examples not specifically depicted or described herein.

Protection circuit 710 includes MOV protection circuit 320 and the universal ground detect (UGD) circuit 730. In one embodiment, MOV protection circuit 320 is implemented as MOV protection circuit 320 of FIG. 3, above, and performs the functionality of MOV protection circuit 220 as described in FIG. 2, above. MOV protection circuit 320 can operate at a higher voltage rating (330 volts rms) and can operate at a higher input voltage (240V AC). In the same or a different embodiment, UGD circuit 730 performs the functionality of UGD circuit 230 as described in FIG. 2, above. In yet another embodiment, UGD circuit 730 functions in a substantially similar way as UGD circuit 330 of FIG. 3 above, but is configured to operate with a single stage of gain and, as a consequence, uses more power and has a higher ground bias current than UGD circuit 330 in FIG. 3. Elements labeled as in FIGS. 3-6, above, function in a substantially similar way. Protection circuit 710 may include additional elements not relevant to the present discussion.

As described above, protection circuit 710 includes MOV protection circuit 320 and the universal ground detect (UGD) circuit 730. MOV protection circuit 320 has an input and an output. The input of MOV protection circuit 320 is electrically coupled and in communication with a power source via a power plug, such as, for example power plug 211 of FIG. 2, above. The output of MOV protection circuit 320 is electrically coupled and in communication with UGD circuit 730. In operation, MOV protection circuit 320 receives power signals from a power plug and provides conditioned power signals to UGD circuit 730. UGD circuit 730 has an input and an output. The input of UGD circuit 730 is electrically coupled and in communication with the output of MOV protection circuit 320. The output of UGD circuit 730 is electrically coupled and in communication with a user device via one or more outlets, such as, for example outlet(s) 212 of FIG. 2, below. In operation, UGD circuit 730 receives conditioned power signals from MOV protection circuit 320 and provides protected power signals to one or more outlets.

In FIG. 7, protection circuit 710 additionally includes a line node 301, a neutral node 302 and a ground node 303 as well as numerous other nodes 304, 351-356, and 761-766. Node 301 is in electrical communication with a line voltage. Node 302 is in electrical communication with the neutral line. Node 303 is in electrical communication with ground.

In operation, line power is supplied to line node 301 (the line input) of MOV protection circuit 320 via a power cord, for example via power plug 211 of power strip 200 of FIG. 2, above. In one embodiment, circuit breaker 322 protects against any dead short conditions. The thermal cutoff of thermal link 323 is thermally linked to crowbar circuit 321. If a fault condition in MOV 325 or fuse 324 is sensed, crowbar circuit 321 activates thermal link 323 and causes thermal link 323 to open, thereby permanently removing power from the RPT-containing exemplary protection circuit 310. In summary, the MOVs, thermal links and fuses of MOV protection circuit 320 protect against abnormal voltages, and surge voltages.

In UGD circuit 730 of FIG. 7, diode 731 includes an anode coupled to node 304 and a cathode coupled to node 761, resister 732 is located between node 761 and node 762, and resistor 733 is located between node 762 and ground node 303. Resistor 734 is located between node 304 and node 761. BJT 735 includes an emitter coupled to node 304, a base coupled to node 761 and a collector coupled to node 763. Light emitting diode (LED) 738 includes a cathode coupled to node 763 and an anode coupled to node 764. Resistor 736 is located between node 764 and node 765 and resistor 737 is located between node 765 and node 766. Diode 739 includes a cathode coupled to node 766 and an anode coupled to neutral node 302. In an example, diode 731 can be implemented as an 1N4148 diode, resistors 732 and 733 can be implemented as 2.4MΩ resistors, resistor 734 can be implemented as a 200 kΩ resistor, transistor 735 can be implemented as a A44 BJT, LED 738 can be implemented as any suitable light emitting diode (e.g., a green LED), resistors 736 and 737 can be implemented as 39 kΩ (0.5 W) resistors, and diode 739 can be implemented as an 1N4007 diode.

In FIG. 7, UGD circuit 730 includes a single transistor BJT 735 that essentially performs the functionality of transistors 335 and 339 in the UGD circuit 330 circuit of FIG. 3, above. UGD circuit 730 includes transistor BJT 735 and associated components that are used to indicate if ground is present at ground node 303 (the line input). If no ground is present at ground node 303 (the line input), diode 738 (implemented as an LED) is not lit and indicates a fault. In FIG. 7, diodes 731, 738, and 739, transistor BJT 735, and resistors 732-734 and 736 and 737 form the ground detect circuit. UGD circuit 730 includes diode 739 that provides DC power for the circuit, and diode 731 prevents any reverse bias from entering the base of transistor BJT 735. If a connection to ground is present at ground node 303 (the line input), the combination of resistors 732 and 733 pull the base of transistor BJT 735 high thereby causing the transistor BJT 735 to conduct. When this situation occurs, a current path is formed for LED 738, through diode 739, transistor BJT 735 and resistors 736 and 737, and LED 738 lights indicating the presence of a ground connection at ground node 303 (the line input). Resistor 734 ensures transistor BJT 735 shuts off when a ground signal is not present at ground node 303 (i.e., resistor R15 counters Icbo, which is current that leaks from the collector of transistor BJT 735 to the base of transistor BJT 735 and could potentially turn on transistor BJT 735 when no ground signal is present). When transistor BJT 735 is not conducting in the absence of a ground signal at ground node 303 (the line input), power is removed from LED 738, and LED 738 is now not lit and indicates the loss of ground. In one embodiment, the pairs of resistors (i.e., 732 and 733, and 736 and 737) are used instead of a single resistor because it can be easier to find and less expensive to use 200 V rated resistors at the resistance or ohm level specified in FIG. 7 than at double the specified resistance or ohm levels.

The advantages of this design are the use of only one transistor (cost reduction), universal ground detection, and the LED indication is positive when ground is present. Advantages of the previous embodiments of FIGS. 3-6 could be lost. Disadvantages include one or two orders of magnitude higher ground bias current being required, and a high running power being required.

Figure 8:
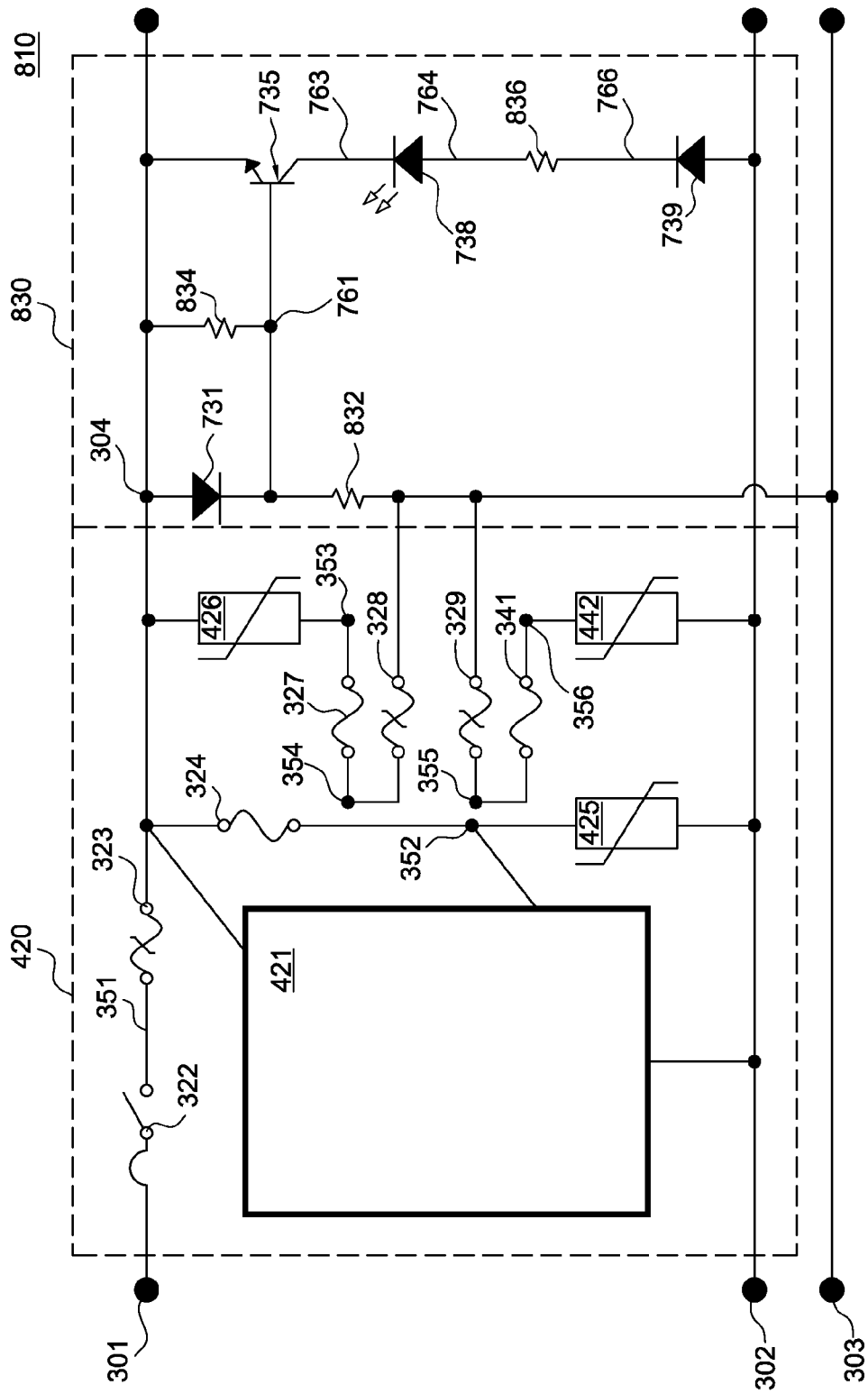
FIG. 8 is a circuit schematic diagram illustrating an embodiment of an exemplary protection circuit of FIG. 2, according to another embodiment.

FIG. 8 is a circuit schematic diagram illustrating an embodiment of an exemplary protection circuit 810, such as, for example, protection circuit 210 of FIG. 2, above. Protection circuit 810 is merely exemplary and is not limited to the embodiments presented herein. Protection circuit 810 can be employed in many different embodiments or examples not specifically depicted or described herein.

Protection circuit 810 includes MOV protection circuit 420 and universal ground detect (UGD) circuit 830. In one embodiment, MOV protection circuit 420 performs the functionality of MOV protection circuit 220 as described in FIG. 2, above. In the same or a different embodiment, UGD circuit 830 performs the functionality of UGD circuit 230 as described in FIG. 2, above. In one embodiment, MOV protection circuit 420 is substantially similar to MOV protection circuit 320 of FIG. 3, above, except for a lower voltage rating (130 volts rms versus 330 volts rms) to operate at a lower input voltage (120V AC versus 240V AC). Elements labeled as in FIGS. 3-7 above function in a substantially similar way. Protection circuit 810 may include additional elements not relevant to the present discussion.

As described above, protection circuit 810 includes MOV protection circuit 420 and the universal ground detect (UGD) circuit 830. MOV protection circuit 420 has an input and an output. The input of MOV protection circuit 420 is electrically coupled and in communication with a power source via a power plug, such as, for example power plug 211 of FIG. 2, above. The output of MOV protection circuit 420 is electrically coupled and in communication with UGD circuit 830. In operation, MOV protection circuit 420 receives power signals from a power plug and provides conditioned power signals to UGD circuit 830. UGD circuit 830 has an input and an output. The input of UGD circuit 830 is electrically coupled and in communication with the output of MOV protection circuit 420. The output of UGD circuit 830 is electrically coupled and in communication with a user device via one or more outlets, such as, for example outlet(s) 212 of FIG. 2, below. In operation, UGD circuit 830 receives conditioned power signals from MOV protection circuit 420 and provides protected power signals to one or more outlets.

As also described above, MOV protection circuit 420 can operate at a lower voltage rating (130 volts rms) and can operate at a lower input voltage (120V AC). In the same or a different embodiment, UGD circuit 830 performs the functionality of UGD circuit 230 as described in FIG. 2, above. It should be noted that the primary difference between UDG circuit 830 and UDG circuit 730 of FIG. 7 is that UDG circuit 830 is designed to operate at 120V AC instead of 230V AC.

In FIG. 8, protection circuit 810 additionally includes a line node 301, a neutral node 302 and a ground node 303 as well as numerous other nodes 304, 351-356, and 761, 763, 764 and 766. Node 301 is in electrical communication with a line voltage. Node 302 is in electrical communication with the neutral line. Node 303 is in electrical communication with ground.

In operation, line power is supplied to line node 301 (the line input) of MOV protection circuit 420 via a power cord, for example via power plug 211 of power strip 200 of FIG. 2, above. In one embodiment, circuit breaker 322 protects against any dead short conditions. The thermal cutoff of thermal link 323 is thermally linked to crowbar circuit 421. If a fault condition in MOV 425 or fuse 324 is sensed, crowbar circuit 421 activates thermal link 323 and causes thermal link 323 to open, thereby permanently removing power from the RPT-containing exemplary protection circuit 310. In summary, the MOVs, thermal links and fuses of MOV protection circuit 420 protect against abnormal voltages, and surge voltages.

In UGD circuit 830 of FIG. 8, diode 731 includes an anode coupled to node 304 and a cathode coupled to node 761, resister 832 is located between node 761 and ground node 303. Resistor 834 is located between node 304 and node 761. BJT 735 includes an emitter coupled to node 304, a base coupled to node 761 and a collector coupled to node 763. Light emitting diode (LED) 738 includes a cathode coupled to node 763 and an anode coupled to node 764. Resistor 836 is located between node 764 and node 766. Diode 739 includes a cathode coupled to node 766 and an anode coupled to neutral node 302. In an example, diode 731 can be implemented as an 1N4148 diode, resistor 832 can be implemented as a 2.4MΩ resistor, resistor 834 can be implemented as a 100 kΩ resistor, transistor 735 can be implemented as a A44 BJT, LED 738 can be implemented as any suitable light emitting diode (e.g., a green LED), resistor 836 can be implemented as a 39 kΩ (0.5 W) resistor, and diode 739 can be implemented as an 1N4007 diode.

In FIG. 8, UGD circuit 830 includes a single transistor BJT 735 that essentially performs the functionality of transistors 335 and 339 in the UGD circuit 330 circuit of FIG. 3, above. UGD circuit 830 includes transistor BJT 735 and associated components that are used to indicate if ground is present at ground node 303 (the line input). If no ground is present at ground node 303 (the line input), diode 738 (implemented as an LED) is not lit and indicates a fault. In FIG. 8, diodes 731, 738, and 739, transistor BJT 735, and resistors 832, 834, and 836 form the ground detect circuit. As in UDG 730 of FIG. 7 above, UGD circuit 830 includes diode 739 that provides DC power for the circuit, and diode 731 prevents any reverse bias from entering the base of transistor BJT 735. If a connection to ground is present at ground node 303 (the line input), resistor 832 pulls the base of transistor BJT 735 high thereby causing the transistor BJT 735 to conduct. When this situation occurs, a current path is formed for LED 738, through diode 739, transistor BJT 735, and resistor 836, and LED 738 lights indicating the presence of a ground connection at ground node 303 (the line input). Resistor 834 ensures transistor BJT 735 shuts off when a ground signal is not present at ground node 303 (i.e., resistor R15 counters Icbo, which is current that leaks from the collector of transistor BJT 735 to the base of transistor BJT 735 and could potentially turn on transistor BJT 735 when no ground signal is present). When transistor BJT 735 is not conducting in the absence of a ground signal at ground node 303 (the line input), power is removed from LED 738, and LED 738 is now not lit and indicates the loss of ground.

The advantages of this design are the use of only one transistor (cost reduction), universal ground detection, and the LED indication is positive as ground is present. As discussed in FIG. 7, advantages of the previous embodiments of FIGS. 3-6 could be lost. Disadvantages include one or two orders of magnitude higher ground bias current being required, and a higher running power being required.

Figure 9:
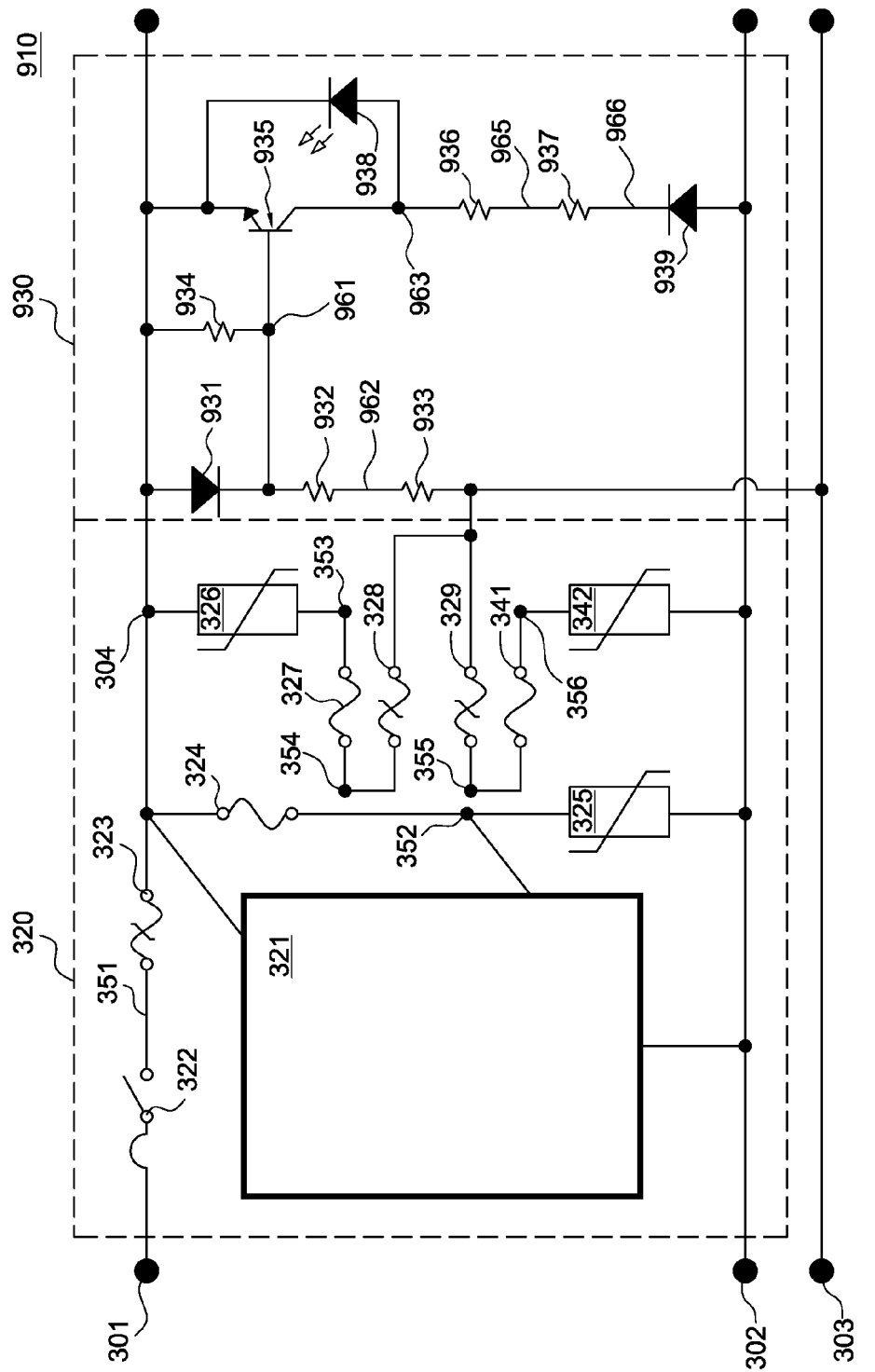
FIG. 9 is a circuit schematic diagram illustrating an embodiment of an exemplary protection circuit of FIG. 2, according to another embodiment.

FIG. 9 is a circuit schematic diagram illustrating an embodiment of an exemplary protection circuit 910, such as, for example, protection circuit 210 of FIG. 2, above. Protection circuit 910 is merely exemplary and is not limited to the embodiments presented herein. Protection circuit 910 can be employed in many different embodiments or examples not specifically depicted or described herein.

Protection circuit 910 includes MOV protection circuit 320 and the universal ground detect (UGD) circuit 930. In one embodiment, MOV protection circuit 320 is implemented as MOV protection circuit 320 of FIG. 3, above, and performs the functionality of MOV protection circuit 220 as described in FIG. 2, above. MOV protection circuit 320 can operate at a higher voltage rating (330 volts rms) and can operate at a higher input voltage (240V AC). In the same or a different embodiment, UGD circuit 930 performs the functionality of UGD circuit 230 as described in FIG. 2, above. In yet another embodiment, UGD circuit 930 functions in a substantially similar way as UGD circuit 330 of FIG. 3 above, but is configured to operate with a single stage of gain and, as a consequence, uses more power and has a higher ground bias current than UGD circuit 330 in FIG. 3. Elements labeled as in FIGS. 3-8, above, function in a substantially similar way. Protection circuit 910 may include additional elements not relevant to the present discussion.

As described above, protection circuit 910 includes MOV protection circuit 320 and the universal ground detect (UGD) circuit 930. MOV protection circuit 320 has an input and an output. The input of MOV protection circuit 320 is electrically coupled and in communication with a power source via a power plug, such as, for example power plug 211 of FIG. 2, above. The output of MOV protection circuit 320 is electrically coupled and in communication with UGD circuit 930. In operation, MOV protection circuit 320 receives power signals from a power plug and provides conditioned power signals to UGD circuit 930. UGD circuit 930 has an input and an output. The input of UGD circuit 930 is electrically coupled and in communication with the output of MOV protection circuit 320. The output of UGD circuit 930 is electrically coupled and in communication with a user device via one or more outlets, such as, for example outlet(s) 212 of FIG. 2, below. In operation, UGD circuit 930 receives conditioned power signals from MOV protection circuit 320 and provides protected power signals to one or more outlets.

In FIG. 9, protection circuit 910 additionally includes a line node 301, a neutral node 302 and a ground node 303 as well as numerous other nodes 304, 351-356, 961-963, 965 and 966. Node 301 is in electrical communication with a line voltage. Node 302 is in electrical communication with the neutral line. Node 303 is in electrical communication with ground.

In operation, line power is supplied to line node 301 (the line input) of MOV protection circuit 320 via a power cord, for example via power plug 211 of power strip 200 of FIG. 2, above. In one embodiment, circuit breaker 322 protects against any dead short conditions. The thermal cutoff of thermal link 323 is thermally linked to crowbar circuit 321. If a fault condition in MOV 325 or fuse 324 is sensed, crowbar circuit 321 activates thermal link 323 and causes thermal link 323 to open, thereby permanently removing power from the RPT-containing exemplary protection circuit 310. In summary, the MOVs, thermal links and fuses of MOV protection circuit 320 protect against abnormal voltages, and surge voltages.

In UGD circuit 930 of FIG. 9, diode 931 includes an anode coupled to node 304 and a cathode coupled to node 961, resister 932 is located between node 961 and node 962, and resistor 933 is located between node 962 and ground node 303. Resistor 934 is located between node 304 and node 961. BJT 935 includes an emitter coupled to node 304, a base coupled to node 961 and a collector coupled to node 963. Light emitting diode (LED) 938 includes a cathode coupled to node 304 and an anode coupled to node 963. Resistor 936 is located between node 963 and node 965 and resistor 937 is located between node 965 and node 966. Diode 939 includes a cathode coupled to node 966 and an anode coupled to neutral node 302. In an example, diode 931 can be implemented as an 1N4148 diode, resistors 932 and 933 can be implemented as 2.4MΩ resistors, resistor 934 can be implemented as a 200 kΩ resistor, transistor 935 can be implemented as a 2N2222A BJT, LED 938 can be implemented as any suitable light emitting diode (e.g., a red LED), resistors 936 and 937 can be implemented as 39 kΩ (0.5 W) resistors, and diode 939 can be implemented as an 1N4007 diode.

In FIG. 9, UGD circuit 930 includes a single transistor BJT 935 that essentially performs the functionality of transistors 335 and 339 in UGD circuit 330 of FIG. 3, above. UGD circuit 930 includes transistor BJT 935 and associated components that are used to indicate if ground is not present at ground node 303 (the line input). If ground is present at ground node 303 (the line input), diode 938 (implemented as a red LED) is not lit indicating no fault. In FIG. 9, diodes 931, 938, and 939, transistor BJT 935, and resistors 932-934 and 936 and 937 form the ground detect circuit. UGD circuit 930 includes diode 939 that provides DC power for the circuit and diode 931 prevents any reverse bias from entering the base of transistor BJT 935. If a connection to ground is present at ground node 303 (the line input), the combination of resistors 932 and 933 pull the base of transistor BJT 935 high thereby causing the transistor BJT 935 to conduct. When this situation occurs, a current path is interrupted for LED, and LED 938 extinguishes indicating the presence of a ground connection. Resistor 934 ensures transistor BJT 935 shuts off when a ground signal is not present at ground node 303 (i.e., resister 934 counters Icbo, which is current that leaks from the collector of transistor BJT 935 to the base and could potentially turn on transistor BJT 935 when a ground signal is absent). When transistor BJT 935 is not conducting in the absence of a ground signal at ground node 303 (the line input), current is supplied to LED 938 via diode 939 and resistors R936 and 937. When current is supplied to LED 938, LED 938 lights up and indicates the absence of ground at ground node 303 (the line input). In one embodiment, the pairs of resistors (i.e., 932 and 933, and 936 and 937) are used instead of a single resistor because it can be easier to find and less expensive to use 200 V rated resistors at the resistance or ohm level specified in FIG. 3 than at double the specified resistance or ohm levels.

As described above, the advantages of this design are, the use of only one transistor (cost reduction), universal ground detection, and the LED indication is negative as ground is not present. Advantages of the previous embodiments of FIG. 3-6 could be lost. As also described above, disadvantages include one or two orders of magnitude higher ground bias current being required, and a higher running power being required.

Figure 10:
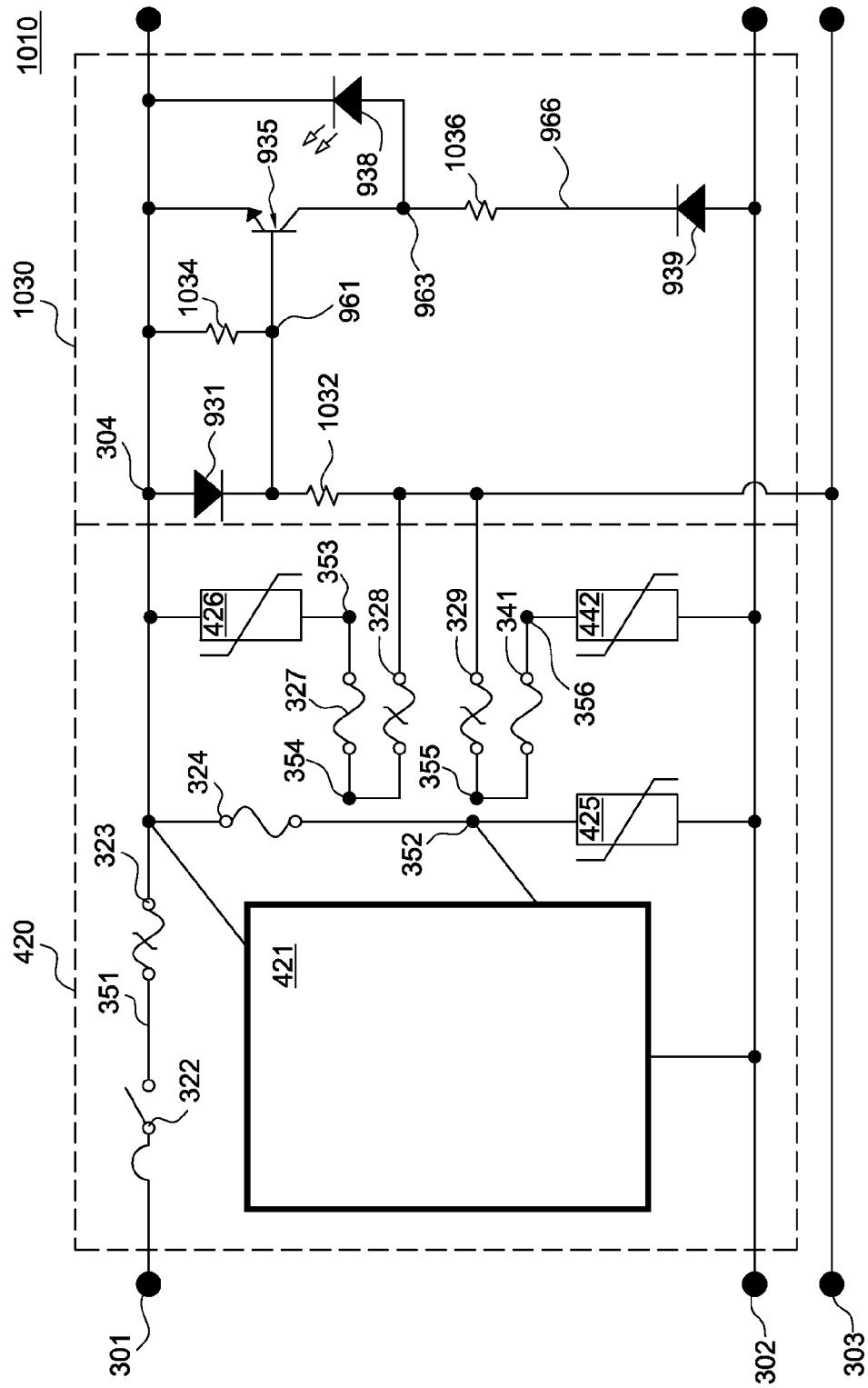
FIG. 10 is a circuit schematic diagram illustrating an embodiment of an exemplary protection circuit of FIG. 2, according to another embodiment.

FIG. 10 is a circuit schematic diagram illustrating an embodiment of an exemplary protection circuit 1010, such as, for example, protection circuit 210 of FIG. 2, above. Protection circuit 1010 is merely exemplary and is not limited to the embodiments presented herein. Protection circuit 1010 can be employed in many different embodiments or examples not specifically depicted or described herein.

Protection circuit 1010 includes MOV protection circuit 420 and universal ground detect (UGD) circuit 1030. In one embodiment, MOV protection circuit 420 performs the functionality of MOV protection circuit 220 as described in FIG. 2, above. In the same or a different embodiment, UGD circuit 1030 performs the functionality of UGD circuit 230 as described in FIG. 2, above. In one embodiment, MOV protection circuit 420 is substantially similar to MOV protection circuit 320 of FIG. 3 above, except for a lower voltage rating (130 volts rms versus 330 volts rms) to operate at a lower input voltage (120V AC versus 240V AC). Elements labeled as in FIGS. 3-9 above function in a substantially similar way. Protection circuit 810 may include additional elements not relevant to the present discussion.

As described above, protection circuit 1010 includes MOV protection circuit 420 and the universal ground detect (UGD) circuit 1030. MOV protection circuit 420 has an input and an output. The input of MOV protection circuit 420 is electrically coupled and in communication with a power source via a power plug, such as, for example power plug 211 of FIG. 2, above. The output of MOV protection circuit 420 is electrically coupled and in communication with UGD circuit 1030. In operation, MOV protection circuit 420 receives power signals from a power plug and provides conditioned power signals to UGD circuit 1030. UGD circuit 1030 has an input and an output. The input of UGD circuit 1030 is electrically coupled and in communication with the output of MOV protection circuit 420. The output of UGD circuit 1030 is electrically coupled and in communication with a user device via one or more outlets, such as, for example outlet(s) 212 of FIG. 2, below. In operation, UGD circuit 1030 receives conditioned power signals from MOV protection circuit 420 and provides protected power signals to one or more outlets.

As also described above, MOV protection circuit 420 can operate at a lower voltage rating (130 volts rms) and can operate at a lower input voltage (120V AC). In the same or a different embodiment, UGD circuit 1030 performs the functionality of UGD circuit 230 as described in FIG. 2, above. It should be noted that the primary difference between UDG 1030 and UDG 930 of FIG. 9 is that UDG 1030 is designed to operate at 120V AC instead of 230V AC.

In FIG. 10, protection circuit 1010 additionally includes a line node 301, a neutral node 302 and a ground node 303 as well as numerous other nodes 304, 351-356, and 961, 963, and 966. Node 301 is in electrical communication with a line voltage. Node 302 is in electrical communication with the neutral line. Node 303 is in electrical communication with ground.

In operation, line power is supplied to line node 301 (the line input) of MOV protection circuit 420 via a power cord, for example via power plug 211 of power strip 200 of FIG. 2, above. In one embodiment, circuit breaker 322 protects against any dead short conditions. The thermal cutoff of thermal link 323 is thermally linked to crowbar circuit 421. If a fault condition in MOV 425 or fuse 324 is sensed, crowbar circuit 421 activates thermal link 323 and causes thermal link 323 to open, thereby permanently removing power from the RPT-containing exemplary protection circuit 310. In summary, the MOVs, thermal links and fuses of MOV protection circuit 420 protect against abnormal voltages, and surge voltages.

In UGD circuit 1030 of FIG. 10, diode 931 includes an anode coupled to node 304 and a cathode coupled to node 961, resister 1032 is located between node 961 and ground node 303. Resistor 1034 is located between node 304 and node 961. BJT 935 includes an emitter coupled to node 304, a base coupled to node 961 and a collector coupled to node 963. Light emitting diode (LED) 938 includes a cathode coupled to node 304 and an anode coupled to node 963. Resistor 1036 is located between node 963 and node 966. Diode 939 includes a cathode coupled to node 966 and an anode coupled to neutral node 302. In an example, diode 931 can be implemented as an 1N4148 diode, resistor 1032 can be implemented as a 2.4MΩ resistor, resistor 1034 can be implemented as a 100 kΩ resistor, transistor 935 can be implemented as a 2N2222A BJT, LED 938 can be implemented as any suitable light emitting diode (e.g., a red LED), resistor 1036 can be implemented as a 39 kΩ (0.5 W) resistor, and diode 939 can be implemented as an 1N4007 diode.

In FIG. 10, UGD circuit 1030 includes a single transistor BJT 935 that essentially performs the functionality of transistors 335 and 339 in UGD circuit 330 of FIG. 3, above. UGD circuit 1030 includes transistor BJT 935 and associated components that are used to indicate if ground is not present at ground node 303 (the line input). If ground is present at ground node 303 (the line input), diode 938 (implemented as a red LED) is not lit to indicate a no fault condition. In FIG. 10, diodes 931, 938, and 939, transistor BJT 935, and resistors 1032, 1034, and 1036 form the ground detect circuit. Resistors 1032 and 1036 in FIG. 10 can be substantially similar to resistors 932 and 936, respectively, in FIG. 9. UGD circuit 1030 includes diode 939 that provides DC power for the circuit, and diode 931 that prevents any reverse bias from entering the base of transistor BJT 935. If a connection to ground is present, resistor 1032 pulls the base of transistor BJT 935 high, thereby causing the transistor BJT 935 to conduct. When transistor BJT 935 is conducting, a current path to LED 938 is interrupted. When this occurs, current flows through transistor BJT 935 via diode 939 and resistor 1036 thereby bypassing LED 938, and LED 938 extinguishes indicating the presence of a ground connection at ground node 303 (the line input). Resistor 1034 ensures transistor BJT 935 shuts off when a ground signal is not present at ground node 303 (i.e., resistor 1034 counters Icbo, which is current that leaks from the collector of transistor BJT 935 to the base of transistor BJT 935 and could potentially turn on transistor BJT 935 when a ground signal is absent). When transistor BJT 935 is not conducting in the absence of a ground signal, power is supplied to LED 938, and LED 938 is lit indicating the absence of ground at ground node 303 (the line input).

As described above, the advantages of this design are, the use of only one transistor (cost reduction), universal ground detection, and the LED indication is negative as ground is not present. Advantages of previous embodiments in FIGS. 3-6 could be lost. Also as described above, disadvantages include one or two orders of magnitude higher ground bias current being required and a higher running power being required.

Figure 11:
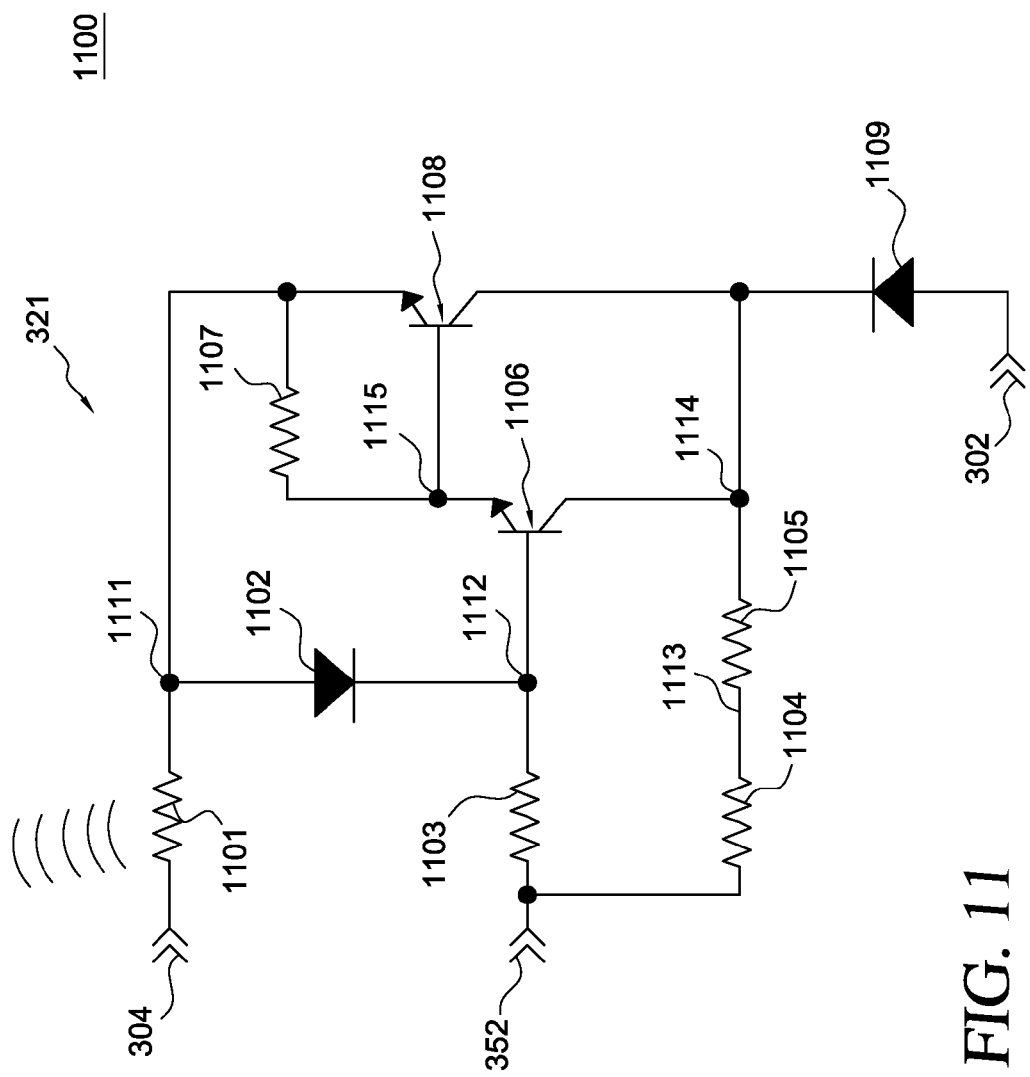
FIG. 11 is a circuit schematic diagram illustrating an embodiment of an exemplary crowbar circuit for use with the exemplary embodiments of FIGS. 3, 5, 7, and 9.

FIG. 11 is a circuit schematic diagram illustrating an embodiment of an exemplary crowbar circuit 1100, such as, for example, crowbar circuit 321 of FIG. 3, above. Crowbar circuit 321 is merely exemplary and is not limited to the embodiments presented herein. Crowbar circuit 321 can be employed in many different embodiments or examples not specifically depicted or described herein.

In FIG. 11, crowbar circuit 321 includes a neutral node 302 as well as numerous other nodes 304 and 1111-1115. Node 302 is in electrical communication with the neutral line. In FIG. 11, resistor 1101 is located between node 304 (see FIG. 3, above) and node 1111, and diode 1102 includes an anode coupled to node 1111 and a cathode coupled to node 1112. Resistor 1103 is located between node 1112 and node 352 (see FIG. 3, above), resistor 1104 is located between node 352 and node 1113, and resistor 1105 is located between node 1113 and node 1114. BJT 1106 includes a base coupled to node 1112, a collector coupled to node 1114, and an emitter coupled to node 1115. Resistor 1107 is located between node 1115 and node 1111. BJT 1108 includes an emitter coupled to node 1111, a base coupled to node 1115, and a collector coupled to node 1114. Diode 1109 includes a cathode coupled to node 1114 and an anode coupled to neutral node 302. In an example, resistor 1101 can be implemented as a 3.3 kΩ (2 W) resistor, diode 1102 can be implemented as an 1N4148 diode, resistor 1103 can be implemented as a 62 kΩ (1 W) resistor, resistors 1104 and 1105 can be implemented as 100 kΩ resistors, transistor 1106 can be implemented as a KSP44 BJT, resistor 1107 can be implemented as a 10 kΩ resistor, transistor 1108 can be implemented as a KSP44 BJT, and diode 1109 can be implemented as an 1N4007 diode. Further, transistors BJT 1106 and BJT 1108 are configured as a Darlington pair.

In crowbar circuit 321, diode 1109 provides the DC power to the circuit, resistor 1107 makes certain BJT 1108 does not conduct when BJT 1106 is off (due to Icbo), and diode 1102 prevents reverse biasing to either BJT 1106 or BJT 1108. The Darlington pair configuration (BJT 1106 and BJT 1108) ensures the base current drive available to BJT 1106 will be enough drive to BJT 1108 to supply enough current for resistor 1101 to overheat the associated fusible link (thermal link 323 of FIG. 3, above). The reason the Darlington pair is utilized in the embodiment is to limit the base drive current and thereby minimize wasted energy/heat in this circuit.

In operation, when the associated MOVs and fuses of MOV protection circuit 320 (of which crowbar circuit 321 is a part) are functioning within normal parameters (e.g., a "no fault" condition), the input at node 352 is at the substantially similar voltage potential as the emitter of BJT 1108. This condition prevents BJT 1106 from conducting and therefore BJT 1108 does not conduct. During a "no fault" condition, resistor 1101 has virtually no current flowing through it as a result and does not get hot.

Continuing the analysis, when a fault occurs in MOV protection circuit 320 (FIG. 3) (e.g., when MOV 325 (FIG. 3) is no longer providing protection or when fuse 324 (FIG. 3) is open), base drive current to BJT 1106 is supplied through either resistor 1103 or resistors 1104 and 1105. This base drive current causes BJT 1108 to conduct and current to flow through resistor 1101 causing resistor 1101 to become very hot and activating thermal link 323 of FIG. 3.

Figure 12:
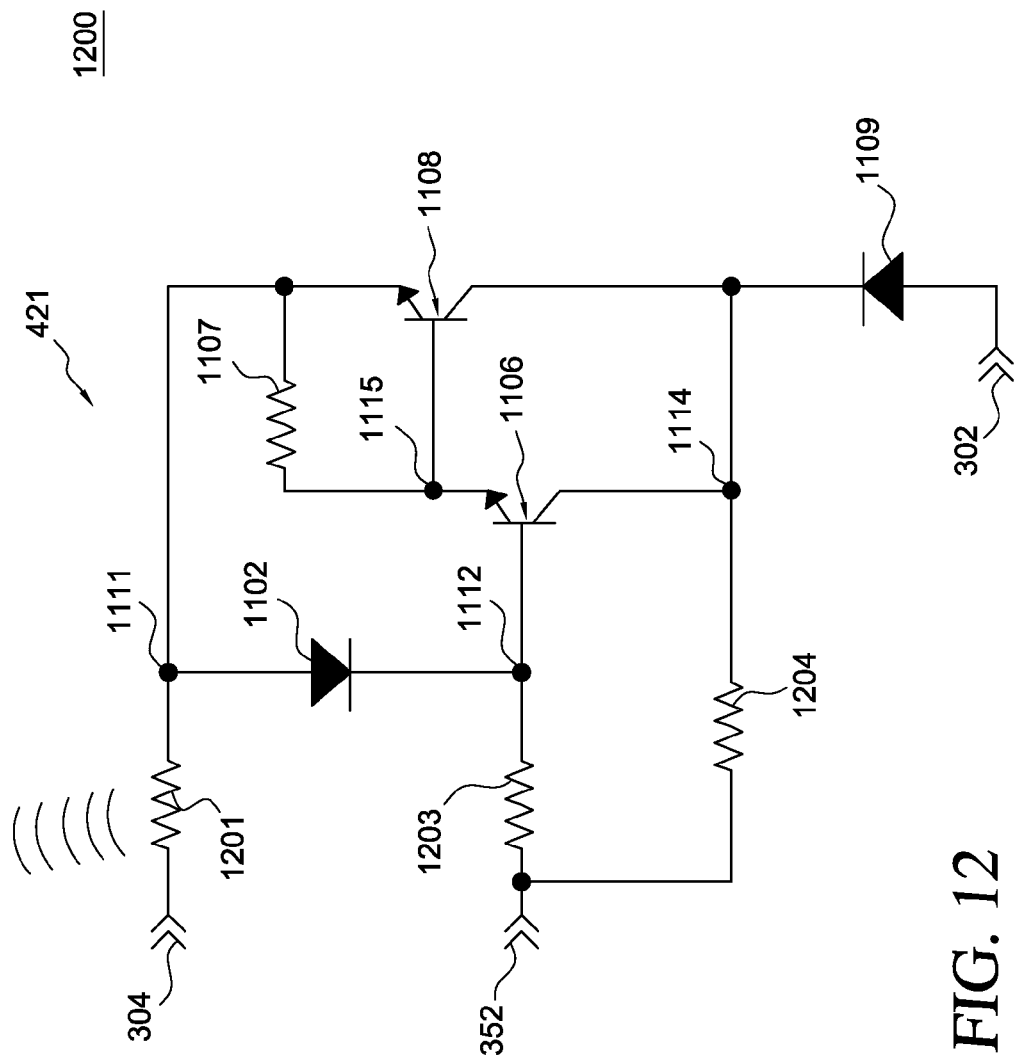
FIG. 12 is a circuit schematic diagram illustrating an embodiment of an exemplary crowbar circuit for use with the exemplary embodiments of FIGS. 4, 6, 8, and 10.

FIG. 12 is a circuit schematic diagram illustrating an embodiment of an exemplary crowbar circuit 1200, such as, for example, crowbar circuit 421 of FIG. 4, above. Crowbar circuit 421 is merely exemplary and is not limited to the embodiments presented herein. Crowbar circuit 421 can be employed in many different embodiments or examples not specifically depicted or described herein.

In FIG. 12, crowbar circuit 421 includes a neutral node 302 as well as numerous other nodes 304, 1111, 1112, 1114, and 1115. Node 302 is in electrical communication with the neutral line. In FIG. 12, resistor 1201 is located between node 304 (see FIG. 4, above) and node 1111, and diode 1102 includes an anode coupled to node 1111 and a cathode coupled to node 1112. Resistor 1203 is located between node 1112 and node 352 (see FIG. 4, above), resistor 1204 is located between node 352 and node 1114. BJT 1106 includes a base coupled to node 1112, a collector coupled to node 1114, and an emitter coupled to node 1115. Resistor 1107 is located between node 1115 and node 1111. BJT 1108 includes an emitter coupled to node 1111, a base coupled to node 1115, and a collector coupled to node 1114. Diode 1109 includes a cathode coupled to node 1114 and an anode coupled to neutral node 302. In an example, resistor 1201 can be implemented as a 910Ω (2 W) resistor, diode 1102 can be implemented as an 1N4148 diode, resistor 1103 can be implemented as a 30 kΩ (0.5 W) resistor, resistor 1104 can be implemented as 100 kΩ resistor, transistor 1106 can be implemented as a KSP44 BJT, resistor 1107 can be implemented as a 10 kΩ resistor, transistor 1108 can be implemented as a KSP44 BJT, and diode 1109 can be implemented as an 1N4007 diode. Further, transistors BJT 1106 and BJT 1108 are configured as a Darlington pair.

In crowbar circuit 421, diode 1109 provides the DC power to the circuit, resistor 1107 makes certain BJT 1108 does not conduct when BJT 1106 is off (due to Icbo), and diode 1102 prevents reverse biasing to either BJT 1106 or BJT 1108. The Darlington pair configuration (BJT 1106 and BJT 1108) ensures the base current drive available to BJT 1106 will be enough drive to BJT 1108 to supply enough current for resistor 1201 to overheat the associated fusible link (thermal link 323 of FIG. 4, above). The reason the Darlington pair is utilized in the embodiment is to limit the base drive current and thereby minimize wasted energy/heat in this circuit.

In operation, when the associated MOVs and fuses of MOV protection circuit 420 (of which crowbar circuit 421 is a part) are functioning within normal parameters (e.g., a "no fault" condition), the input at node 352 is at the substantially similar voltage potential as the emitter of BJT 1108. This condition prevents BJT 1106 from conducting and therefore BJT 1108 does not conduct. During a "no fault" condition, resistor 1201 has virtually no current flowing through it as a result and does not get hot.

Continuing the analysis, when a fault occurs in MOV protection circuit 420 (e.g., when MOV 425 is no longer providing protection or when fuse 324 is open), base drive current to BJT 1106 is supplied through either resistor 1203 or resistor 1204. This base drive current causes BJT 1108 to conduct and current to flow through resistor 1201 causing resistor 1201 to become very hot and activating thermal link 323 of FIG. 4.

Figure 13:
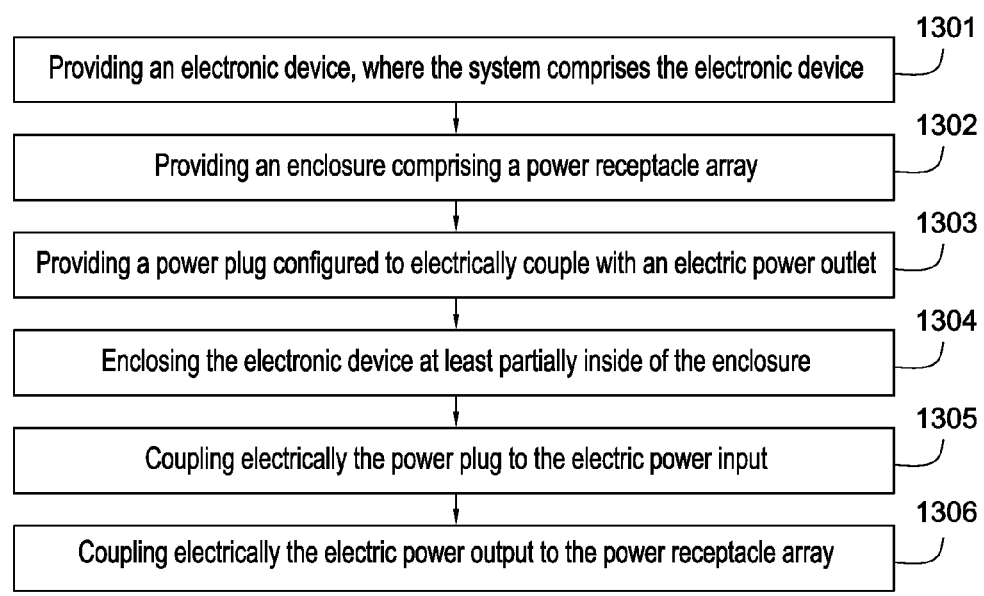
FIG. 13 illustrates a flow chart for an embodiment of a method of manufacturing a system.

FIG. 13 illustrates a flow chart for an embodiment of a method 1300 of manufacturing a system. Method 1300 is merely exemplary and is not limited to the embodiments presented herein. Method 1300 can be employed in many different embodiments or examples not specifically depicted or described herein. In some embodiments, the procedures, the processes, and/or the activities of method 1300 can be performed in the order presented. In other embodiments, the procedures, the processes, and/or the activities of the method 1300 can be performed in any other suitable order. In still other embodiments, one or more of the procedures, the processes, and/or the activities in method 1300 can be combined or skipped.

Figure 14:
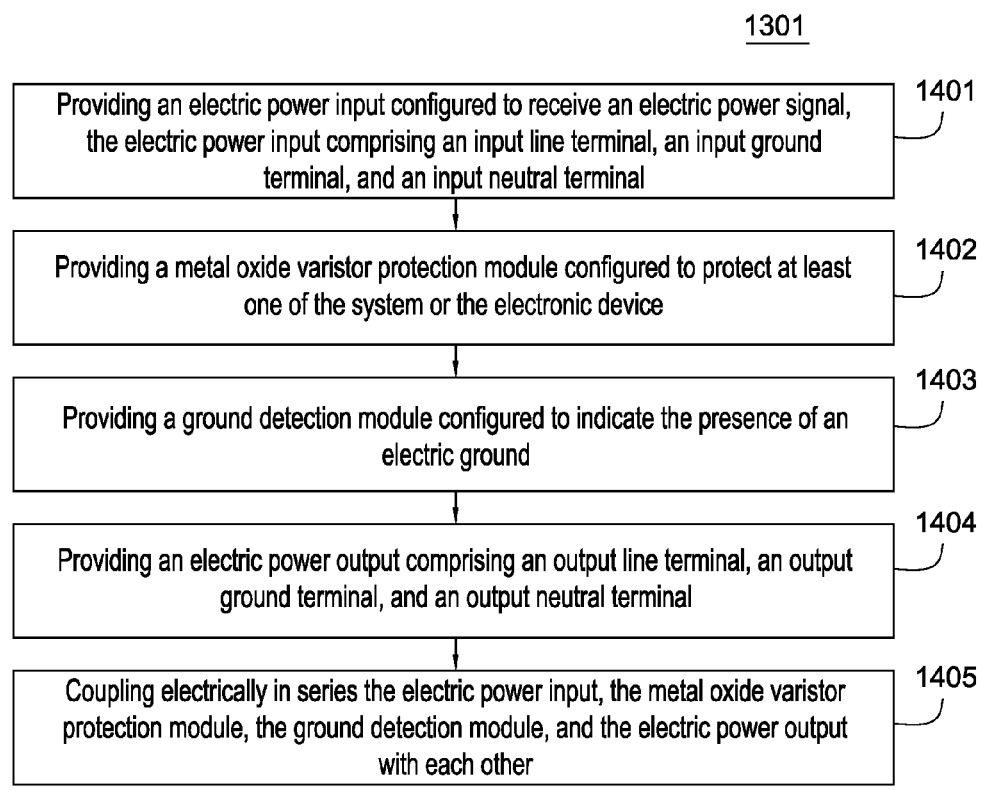
FIG. 14 illustrates a flow chart for an exemplary embodiment of procedure, according to an embodiment.

Referring now to FIG. 13, method 1300 comprises procedure 1301 of providing an electronic device, where the system comprises the electronic device. In some embodiments, the electronic device can be similar to at least part of power strip 200, as described above. FIG. 14 illustrates a flow chart for an exemplary embodiment of procedure 1301, according to an embodiment.

Referring now to FIG. 14, in some embodiments, procedure 1301 comprises process 1401 of providing an electric power input configured to receive an electric power signal, the electric power input comprising an input line terminal, an input ground terminal, and an input neutral terminal. In some embodiments, the electric power input comprises an input line terminal and an input neutral terminal.

Referring again to FIG. 14, in some embodiments, procedure 1301 (FIG. 13) comprises process 1402 of providing a metal oxide varistor protection module configured to protect at least one of the system or the electronic device. In the same or different embodiments, process 1402 can comprise one or more activities for providing the various components of an MOV protection circuit similar to either of MOV protection circuit 320 (e.g., FIG. 3) and MOV protection circuit 420 (e.g., FIG. 4).

Referring again to FIG. 14, in some embodiments, procedure 1301 comprises process 1403 of providing a ground detection module configured to indicate the presence of an electric ground. In the same or different embodiments, process 1403 can comprise one or more activities for providing the various components of a universal ground detect similar to any of universal ground detect 330 (FIG. 3), universal ground detect 430 (FIG. 4), universal ground detect 530 (FIG. 5), universal ground detect 630 (FIG. 6), universal ground detect 730 (FIG. 7), universal ground detect 830 (FIG. 8), universal ground detect 930 (FIG. 9), and universal ground detect 1030 (FIG. 10), each of which is described in detail above.

Referring again to FIG. 14, in some embodiments, procedure 1301 can comprise process 1404 of providing an electric power output comprising an output line terminal, an output ground terminal, and an output neutral terminal. In other embodiments, procedure 1301 (FIG. 13) can comprise a process of providing an electric power output comprising an output line terminal and an output neutral terminal.

Referring again to FIG. 14, in some embodiments, procedure 1301 comprises process 1405 of coupling electrically in series the electric power input, the metal oxide varistor protection module, the ground detection module, and the electric power output with each other. In the same or different embodiments, process 1405 can comprise one or more activities for electrically coupling the electric power input, the metal oxide varistor protection module, the ground detection module, and the electric power output as depicted in FIG. 2 and any of FIGS. 3-12 and as described above with respect to power strip 200 (FIG. 2) and any combination of MOV protection circuit 320 (FIG. 3) with universal ground detect 330 (FIG. 3), universal ground detect 530 (FIG. 5), universal ground detect 730 (FIG. 7), and universal ground detect 930 (FIG. 9) and/or any combination of MOV protection circuit 420 (FIG. 4) with universal ground detect 430 (FIG. 4), universal ground detect 630 (FIG. 6), universal ground detect 830 (FIG. 8), and universal ground detect 1030 (FIG. 10).

Returning now to FIG. 13, in some embodiments, method 1300 can comprise procedure 1302 of providing an enclosure comprising a power receptacle array. In some embodiments, the enclosure and/or power receptacle array can be similar to enclosure 120 (FIG. 1) and/or power receptacle array 125 (FIG. 1), respectively, as described above.

Referring again to FIG. 13, in some embodiments, method 1300 can comprise procedure 1303 of providing a power plug configured to electrically couple with an electric power outlet. In some embodiments, the power plug can be similar to power plug 130 (FIG. 1).

Referring again to FIG. 13, in some embodiments, method 1300 can comprise procedure 1304 of enclosing the electronic device at least partially inside of the enclosure.

Referring again to FIG. 13, in some embodiments, method 1300 can comprise procedure 1305 of coupling electrically the power plug to the electric power input.

Referring again to FIG. 13, in some embodiments, method 1300 can comprise procedure 1306 of coupling electrically the electric power output to the power receptacle array.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that procedures 1301-1306 of FIG. 13 and/or processes 1401-1405 of FIG. 14 may be comprised of many different procedures, processes and/or activities and be performed by many different modules, in many different orders, that any element of FIGS. 1-14 may be modified, and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising an electronic device, the electronic device comprising:
    an electric power input configured to receive an electric power signal, the electric power input comprising an input line terminal, an input ground terminal, and an input neutral terminal;
    a first means for protecting at least one of the system or the electronic device;
    a second means for indicating a presence of an electric ground even if the electric ground is at a different electric potential than at least one of the input neutral terminal or an output neutral terminal; and
    an electric power output comprising an output line terminal, an output ground terminal, and the output neutral terminal;
    wherein:
        the electric power input, the first means, the second means, and the electric power output are electrically coupled in series with each other.

2. The system of claim 1 wherein:
    the first means is configured to protect the at least one of the system or the electronic device from voltages greater than at least one of:
        a 330 volt root-mean-squared voltage; or
        a 130 volt root-mean-squared voltage.

3. The system of claim 1 further comprising:
    an enclosure comprising a power receptacle array; and
    a power plug configured to electrically couple with an electric power outlet;
    wherein:
        the enclosure houses at least a portion of the electronic device;
        the power plug is electrically coupled to the electric power input; and the electric power output is electrically coupled to the power receptacle array.

4. A system comprising an electronic device, the electronic device comprising:
an electric power input configured to receive an electric power signal, the electric power input comprising an input line terminal, an input ground terminal, and an input neutral terminal;
a metal oxide varistor protection module configured to protect at least one of the system or the electronic device;
a ground detection module configured to indicate a presence of an electric ground even if the electric ground is at a different electric potential than at least one of the input neutral terminal or an output neutral terminal; and
an electric power output comprising an output line terminal, an output ground terminal, and the output neutral terminal;
wherein:
the electric power input, the metal oxide varistor protection module, the ground detection module, and the electric power output are electrically coupled in series with each other.

5. The system of claim 4 wherein:
the metal oxide varistor protection module comprises:
a circuit breaker, a first thermal link, a first fuse, a first metal oxide varistor, a second metal oxide varistor, a second fuse, a second thermal link, a third thermal link, a third fuse, a third metal oxide varistor, a first crowbar circuit;
a first node electrically coupling the input line terminal and the circuit breaker;
a second node electrically coupling the circuit breaker and the first thermal link;
a third node electrically coupling the first thermal link, the first fuse, the second metal oxide varistor, the first crowbar circuit, and the output line terminal;
a fourth node electrically coupling the first fuse, the first crowbar circuit, and the first metal oxide varistor;
a fifth node electrically coupling the second metal oxide varistor and the second fuse;
a sixth node electrically coupling the second fuse and the second thermal link;
a seventh node electrically coupling the second thermal link, the third thermal link, the input ground terminal, and the output ground terminal;
an eighth node electrically coupling the third thermal link and the third fuse;
a ninth node electrically coupling the third fuse and the third metal oxide varistor; and
a tenth node electrically coupling the input neutral terminal, the first crowbar circuit, the first metal oxide varistor, the third metal oxide varistor, and the output neutral terminal.

6. The system of claim 5 further comprising:
a second crowbar circuit and a third crowbar circuit;
wherein:
the second crowbar circuit is electrically coupled to the fifth node, the sixth node, and the tenth node; and
the third crowbar circuit is electrically coupled to the eighth node, the ninth node, and the tenth node.

7. The system of claim 5 wherein:
the first metal oxide varistor, the second metal oxide varistor, the third metal oxide varistor, and the first crowbar circuit are configured for at least one of:
a root-mean-squared voltage of 330 volts; or
a root-mean-squared voltage of 130 volts.

8. The system of claim 4 wherein:
the ground detection module comprises:
a first diode, a first resistive element, a second resistive element, a first transistor, a third resistive element, an indicator module, a second transistor, a fourth resistive element, and a second diode;
a first node electrically coupling the input line terminal, the first diode, the second resistive element, the first transistor, the indicator module, and the output line terminal;
a second node electrically coupling the first diode, the first resistive element, the second resistive element, and the first transistor;
a third node electrically coupling the input ground terminal, the first resistive element, and the output ground terminal;
a fourth node electrically coupling the first transistor, the second transistor, and the third resistive element;
a fifth node electrically coupling the indicator module and the second transistor;
a sixth node electrically coupling the second transistor and the fourth resistive element;
a seventh node electrically coupling the third resistive element, the fourth resistive element and the second diode; and
an eighth node electrically coupling the second diode, the input neutral terminal, and the output neutral terminal.

9. The system of claim 8 wherein:
the first resistive element comprises a first pair of resistors electrically coupled in series with each other;
the third resistive element comprises a second pair of resistors electrically coupled in series with each other; and
the fourth resistive element comprises a third pair of resistors electrically coupled in series with each other.

10. The system of claim 9 wherein:
the indicator module comprises a light emitting diode.

11. The system of claim 8 wherein:
the indicator module comprises a light emitting diode.

12. The system of claim 4 wherein:
the ground detection module comprises:
a first diode, a first resistive element, a second resistive element, a first transistor, a third resistive element, an indicator module, a second transistor, a fourth resistive element, and a second diode;
a first node electrically coupling the input line terminal, the first diode, the second resistive element, the first transistor, the second transistor, the indicator module, and the output line terminal;
a second node electrically coupling the first diode, the first resistive element, the second resistive element, and the first transistor;
a third node electrically coupling the input ground terminal, the first resistive element, and the output ground terminal;
a fourth node electrically coupling the first transistor, the second transistor, and the third resistive element;
a fifth node electrically coupling the second transistor, the indicator module, and the fourth resistive element;
a sixth node electrically coupling the third resistive element, the fourth resistive element and the second diode; and
a seventh node electrically coupling the second diode, the input neutral terminal, and the output neutral terminal.

13. The system of claim 12 wherein:
the first resistive element comprises a first pair of resistors electrically coupled in series with each other;
the third resistive element comprises a second pair of resistors electrically coupled in series with each other; and
the fourth resistive element comprises a third pair of resistors electrically coupled in series with each other.

14. The system of claim 4 wherein:
the ground detection module comprises:
- a first diode, a first resistive element, a second resistive element, a first transistor, a third resistive element, an indicator module, and a second diode;
- a first node electrically coupling the input line terminal, the first diode, the second resistive element, the first transistor, and the output line terminal;
- a second node electrically coupling the first diode, the first resistive element, the second resistive element, and the first transistor;
- a third node electrically coupling the input ground terminal, the first resistive element, and the output ground terminal;
- a fourth node electrically coupling the first transistor and the indicator module;
- a fifth node electrically coupling the indicator module and the third resistive element;
- a sixth node electrically coupling the third resistive element and the second diode; and
- a seventh node electrically coupling the second diode, the input neutral terminal, and the output neutral terminal.

15. The system of claim 14 wherein:
the first resistive element comprises a first pair of resistors electrically coupled in series; and
the third resistive element comprises a second pair of resistors electrically coupled in series.

16. The system of claim 4 wherein:
the ground detection module comprises:
- a first diode, a first resistive element, a second resistive element, a first transistor, a third resistive element, an indicator module, and a second diode;
- a first node electrically coupling the input line terminal, the first diode, the second resistive element, the first transistor, the indicator module, and the output line terminal;
- a second node electrically coupling the first diode, the first resistive element, the second resistive element, and the first transistor;
- a third node electrically coupling the input ground terminal, the first resistive element, and the output ground terminal;
- a fourth node electrically coupling the first transistor, the indicator module, and the third resistive element;
- a fifth node electrically coupling the third resistive element and the second diode; and
- a sixth node electrically coupling the second diode, the input neutral terminal, and the output neutral terminal.

17. The system of claim 16 wherein:
the first resistive element comprises a first pair of resistors electrically coupled in series; and
the third resistive element comprises a second pair of resistors electrically coupled in series.

18. The system of claim 4 further comprising:
a second electric power outlet;
wherein:
the second electric power outlet is electrically coupled in series with the electric power input, the metal oxide varistor protection module, and the ground detection module.

19. The system of claim 4 further comprising:
a second metal oxide varistor protection module;
a second ground detection module; and
a second electric power output;
wherein:
the second electric power output is electrically coupled in series with the electric power input, the second metal oxide varistor protection module, and the second ground detection module.

20. The system of claim 4 further comprising:
an enclosure comprising a power receptacle array; and
a power plug configured to electrically couple with an electric power outlet;
wherein:
the enclosure houses at least a portion of the electronic device;
the power plug is electrically coupled to the electric power input; and
the electric power output is electrically coupled to the power receptacle array.

21. The system claim 8 further comprising:
an enclosure comprising a power receptacle array and an indicator interface; and
a power plug configured to electrically couple with an electric power outlet;
wherein:
the enclosure houses at least a portion of the electronic device;
the power plug is electrically coupled to the electric power input;
the electric power output is electrically coupled to the power receptacle array; and
the indicator module is located at the indicator interface.

22. The system of any one of claims 4 wherein:
the electric power input is electrically coupled to an input of the metal oxide varistor protection module;
an output of the metal oxide varistor protection module is electrically coupled to an input of the ground detection module; and
an output of the ground detection module is electrically coupled to the electric power output.

23. A method of manufacturing a system, the method comprising:
providing an electronic device, the system comprising the electronic device, wherein providing the electronic device comprises:
- providing an electric power input configured to receive an electric power signal, the electric power input comprising an input line terminal, an input ground terminal, and an input neutral terminal;
- providing a metal oxide varistor protection module configured to protect at least one of the system or the electronic device;
- providing a ground detection module configured to indicate a presence of an electric ground even if the electric ground is at a different electric potential than at least one of the input neutral terminal or an output neutral terminal;
- providing an electric power output comprising an output line terminal, an output ground terminal, and the output neutral terminal; and coupling electrically in series with each other the electric power input, the metal oxide varistor protection module, the ground detection module, and the electric power output.

24. The method of claim 23 further comprising:
providing an enclosure comprising a power receptacle array;
providing a power plug configured to electrically couple with an electric power outlet;
enclosing the electronic device at least partially inside of the enclosure;
coupling electrically the power plug and the electric power input; and
coupling electrically the electric power output and the power receptacle array.

25. A system comprising an electronic device, the electronic device comprising:
an electric power input configured to receive an electric power signal, the electric power input comprising an input line terminal, an input ground terminal, and an input neutral terminal;
a metal oxide varistor protection module configured to protect at least one of the system or the electronic device;
a ground detection module configured to indicate a presence of an electric ground; and
an electric power output comprising an output line terminal, an output ground terminal, and an output neutral terminal;
wherein:
the metal oxide varistor protection module comprises:
a circuit breaker, a first thermal link, a first fuse, a first metal oxide varistor, a second metal oxide varistor, a second fuse, a second thermal link, a third thermal link, a third fuse, a third metal oxide varistor, and a first crowbar circuit;
the ground detection module comprises:
a first diode, a first resistive element, a second resistive element, a first transistor, a third resistive element, a light emitting diode, a second transistor, a fourth resistive element, and a second diode;
the electronic device further comprises:
a first node electrically coupling the input line terminal and the circuit breaker;
a second node electrically coupling the circuit breaker and the first thermal link;
a third node electrically coupling the first thermal link, the first crowbar circuit, the first fuse, the second metal oxide varistor, the first diode, the second resistive element, the first transistor, the light emitting diode, and the output line terminal;
a fourth node electrically coupling the first fuse, the first crowbar circuit, and the first metal oxide varistor;
a fifth node electrically coupling the input neutral terminal, the first crowbar circuit, the first metal oxide varistor, the third metal oxide varistor, the second diode, and the output neutral terminal;
a sixth node electrically coupling the input ground terminal, the output ground terminal, the second thermal link, the third thermal link, and the first resistive element;
a seventh node electrically coupling the second metal oxide varistor and the second fuse;
an eighth node electrically coupling the second fuse and the second thermal link;
a ninth node electrically coupling the third thermal link and the third fuse;
a tenth node electrically coupling the third fuse and the third metal oxide varistor;
an eleventh node electrically coupling the first diode, the first resistive element, the second resistive element, and the first transistor;
a twelfth node electrically coupling the first transistor, the second transistor, and the third resistive element;
a thirteenth node electrically coupling the light emitting diode and the second transistor;
a fourteenth node electrically coupling the second transistor and the fourth resistive element; and
a fifteenth node electrically coupling the third resistive element, the fourth resistive element, and the second diode;
and
the first metal oxide varistor, the second metal oxide varistor, the third metal oxide varistor, and the first crowbar circuit are configured for at least one of:
a root-mean-squared voltage of 330 volts; or
a root-mean-squared voltage of 130 volts.

* * * * *